US011026065B2

(12) United States Patent
Kim et al.

(10) Patent No.: US 11,026,065 B2
(45) Date of Patent: Jun. 1, 2021

(54) SERVER AND ELECTRONIC DEVICE FOR TRANSMITTING AND RECEIVING INFORMATION RELATED TO BEACON

(71) Applicant: Samsung Electronics Co., Ltd., Suwon-si (KR)

(72) Inventors: Ji Yeon Kim, Yongin-si (KR); Ki Hong Kwon, Yongin-si (KR); Kwang Sub Kim, Yongin-si (KR); Sang Hyun Park, Hwaseong-si (KR); Jae Min Seo, Yongin-si (KR); Tae Jung Shim, Seoul (KR); Byung Woo Lee, Suwon-si (KR); Sei Jin Lee, Seoul (KR); Chang Ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/466,910

(22) PCT Filed: Nov. 22, 2017

(86) PCT No.: PCT/KR2017/013344
§ 371 (c)(1),
(2) Date: Jun. 5, 2019

(87) PCT Pub. No.: WO2018/105930
PCT Pub. Date: Jun. 14, 2018

(65) Prior Publication Data
US 2020/0068363 A1    Feb. 27, 2020

(30) Foreign Application Priority Data

Dec. 6, 2016 (KR) .................. 10-2016-0165401

(51) Int. Cl.
*H04W 4/23* (2018.01)
*H04W 4/80* (2018.01)
(Continued)

(52) U.S. Cl.
CPC ............ *H04W 4/23* (2018.02); *H04W 4/80* (2018.02); *H04W 80/12* (2013.01); *H04W 88/18* (2013.01)

(58) Field of Classification Search
CPC ......... H04W 4/23; H04W 4/80; H04W 80/12; H04W 40/24; H04W 4/02–029
See application file for complete search history.

(56) References Cited

U.S. PATENT DOCUMENTS 7,363,291 B1 * 4/2008 Page .................. G06F 16/958
707/706
8,738,024 B1    5/2014 Kerr et al.
(Continued)

FOREIGN PATENT DOCUMENTS

KR    10-2015-0089666 A    8/2015
KR    10-1655731 B1       9/2016
WO    2016/011178 A1     1/2016

*Primary Examiner* — Gennadiy Tsvey
(74) *Attorney, Agent, or Firm* — Jefferson IP Law, LLP

(57) ABSTRACT

A server according to an embodiment of the disclosure may include at least one processor and storage, wherein the at least one processor may be configured to receive beacon information including information on at least one website from the electronic device, collect data from a first website of the at least one website based on the beacon information, generate content having a structured document format based on at least a part of the collected data, and transmit the generated content to the electronic device.

11 Claims, 21 Drawing Sheets

(51) Int. Cl.
    *H04W 80/12*           (2009.01)
    *H04W 88/18*           (2009.01)

(56)           References Cited

U.S. PATENT DOCUMENTS

| | | | |
|---|---|---|---|
| 9,022,637 B2 | 5/2015 | Meyer et al. | |
| 9,275,361 B2 | 3/2016 | Meyer | |
| 9,414,295 B2 | 8/2016 | Trehan | |
| 9,691,308 B2 | 6/2017 | Meyer et al. | |
| 2002/0032746 A1* | 3/2002 | Lazaridis | G06Q 20/20 709/217 |
| 2003/0106025 A1* | 6/2003 | Cho | G06F 16/9577 715/239 |
| 2005/0132286 A1* | 6/2005 | Rohrabaugh | G06F 3/0488 715/239 |
| 2011/0119125 A1 | 5/2011 | Javangula et al. | |
| 2012/0079010 A1* | 3/2012 | Song | H04N 21/25808 709/203 |
| 2014/0201041 A1 | 7/2014 | Meyer | |
| 2014/0201042 A1 | 7/2014 | Meyer | |
| 2014/0268949 A1 | 9/2014 | Kayser | |
| 2014/0321105 A1 | 10/2014 | Meyer et al. | |
| 2014/0365344 A1 | 12/2014 | Meyer | |
| 2015/0108838 A1 | 4/2015 | Pierce | |
| 2015/0110153 A1 | 4/2015 | Hoblit et al. | |
| 2015/0120821 A1* | 4/2015 | Bendell | G06F 16/957 709/203 |
| 2015/0215737 A1 | 7/2015 | Shin et al. | |
| 2015/0235577 A1 | 8/2015 | Meyer et al. | |
| 2015/0312839 A1 | 10/2015 | Trehan | |
| 2015/0317682 A1 | 11/2015 | Kayser et al. | |
| 2016/0048798 A1 | 2/2016 | Meyer et al. | |
| 2016/0094946 A1 | 3/2016 | Keithley | |
| 2017/0164214 A1* | 6/2017 | Hara | H04W 4/80 |
| 2018/0048729 A1* | 2/2018 | Duvdevani | H04L 67/2814 |

* cited by examiner

SERVER AND ELECTRONIC DEVICE FOR TRANSMITTING AND RECEIVING INFORMATION RELATED TO BEACON

CROSS-REFERENCE TO RELATED APPLICATION(S)

This application is a U.S. National Stage application under 35 U.S.C. § 371 of an International application number PCT/KR2017/013344, filed on Nov. 22, 2017, which is based on and claimed priority of a Korean patent application number 10-2016-0165401, filed on Dec. 6, 2016, in the Korean Intellectual Property Office, the disclosure of which is incorporated by reference herein in its entirety.

TECHNICAL FIELD

Embodiments of the disclosure relate to technology for transmitting/receiving information associated with a beacon.

BACKGROUND ART

With the development of communication technology, technique for attaching a sensor to an object and transmitting and receiving data in real time (Internet of things) has been widely spread. With this technology, objects connected to the Internet may transmit/receive data to other objects without human intervention. For example, a beacon may transmit data to an electronic device such as a smartphone through Bluetooth.

The electronic device may obtain content (e.g., messages, coupons, etc.) from the data received from the beacon and output the content to a display. For example, when a beacon installed in a clothing store transmits data to an electronic device, the electronic device may obtain a message welcoming a store visit, a product discount coupon or the like from the data and output it to a display.

DISCLOSURE

Technical Problem

A method for obtaining content from data received from a beacon in an electronic device may be different depending on formats of a beacon. For example, when a format of a beacon uses an ID, the electronic device may obtain the content only through a specific application capable of processing the ID. When a format of a beacon uses a URL, the electronic device may obtain the content only by accessing a website using a specific protocol. In addition, when a format of a beacon uses a URL, the electronic device directly crawls the content on the website, so that power consumption of the electronic device may be large and the data consumption may be large.

The embodiments disclosed in the disclosure are intended to provide a server and an electronic device for solving the above-mentioned problems and the problems raised in the disclosure.

Technical Solution

In accordance with an aspect of the disclosure, at least one server may include at least one processor and storage, wherein the at least one processor may be configured to receive beacon information including information on at least one website from the electronic device, collect data from a first website of the at least one website based on the beacon information, generate content having a structured document format based on at least a part of the collected data, and transmit the generated content to the electronic device.

In accordance with another aspect of the disclosure, an electronic device may include a communication circuit, at least one processor electrically connected to the communication circuit, and a memory electrically connected to the at least one processor, wherein the memory may store instructions that cause the at least one processor to receive at least one piece of beacon information from an external electronic device using the communication circuit, determine whether data corresponding to the received at least one piece of beacon information is stored in the memory, generate content having a structured document format including at least a part of the stored data based at least partially on the determination, and transmit the content to the external electronic device.

In accordance with another aspect of the disclosure, an electronic device may include a communication circuit, a memory, a display, and at least one processor, wherein the at least one processor may be configured to, when at least one beacon capable of communicating with the electronic device is found, transmit at least a part of beacon information associated with the found beacon to a server, receive content having a structured document format generated based on data corresponding to the transmitted beacon information from the server, and output the content having a structured document format to the display.

Advantageous Effects

According to the embodiments of the disclosure, it is possible to provide content to a user regardless of a type of a beacon.

According to the embodiments of the disclosure, it is possible to reduce power consumption and data consumption of the electronic device.

In addition, various effects directly or indirectly understood through the disclosure may be provided.

MODE FOR INVENTION

Figure 1:
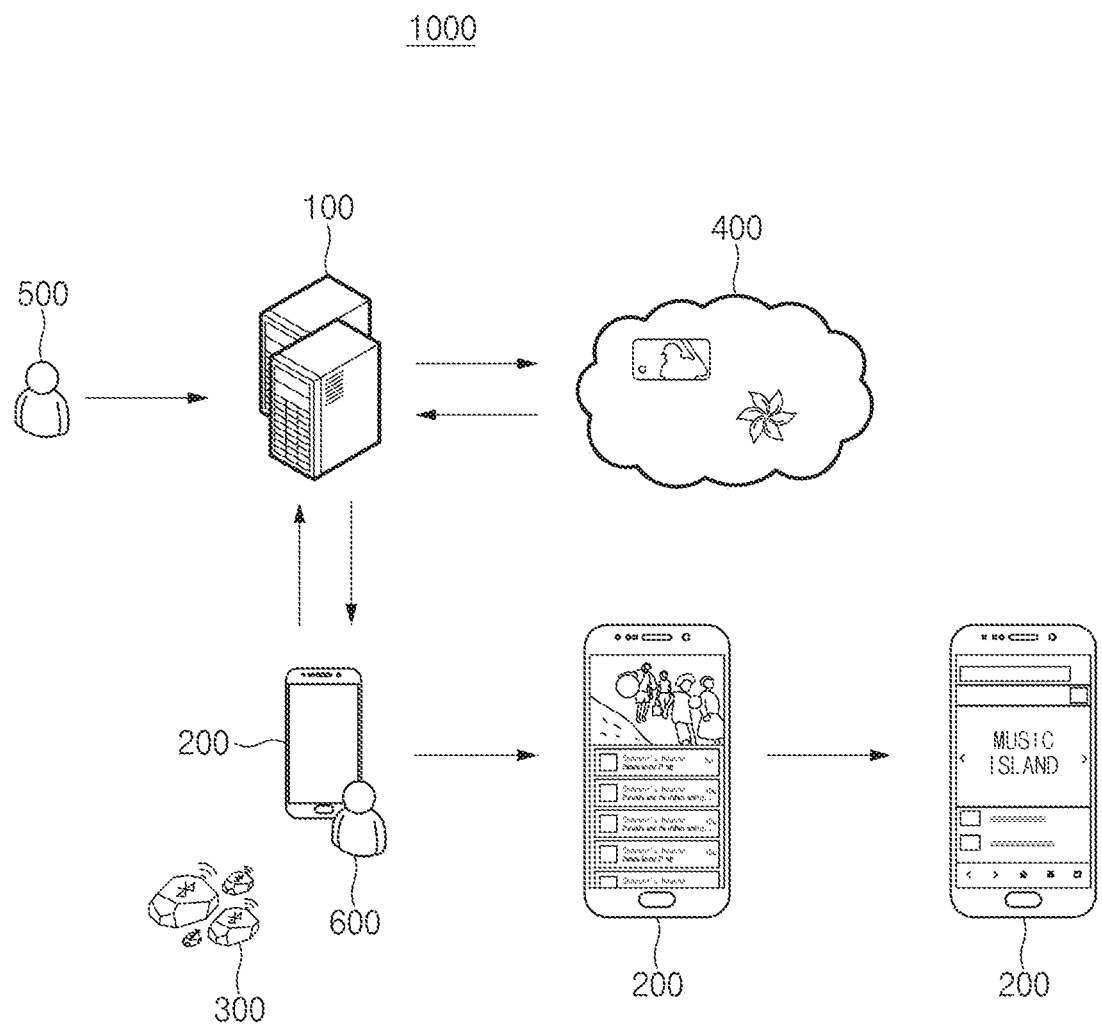
FIG. 1 illustrates a server and an electronic device in network environment according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 illustrates a server and an electronic device in network environment according to an embodiment.

Referring to FIG. 1, a system 1000 that transmits and receives information associated with a beacon 300 may include a server 100 and an electronic device 200. The server 100 may be connected to the electronic device 200 and a website 400 and transmit and receive data to and from the electronic device 200 and the website 400. According to an embodiment, the server 100 may collect at least some data of the website 400 and store the collected data in storage. When beacon information is received from the electronic device 200, the server 100 may generate content having a structured document format based on data corresponding to the beacon information among the data stored in the storage. When the content having a structured document format is generated, the server 100 may transmit the content to the electronic device 200. When there is no data corresponding to the beacon information in the storage, the server 100 may collect data from the website 400 and store the collected data in the storage. The server 100 may generate content having a structured document format based on the collected data. When the content having a structured document format is generated, the server 100 may transmit the content to the electronic device 200.

According to an embodiment, the server 100 may receive data from a service provider 500 and store the received data in the storage. When beacon information is received from the electronic device 200, the server 100 may generate content having a structured document format based on data corresponding to the beacon information among the data received from the service provider 500. When the content having a structured document format is generated, the server 100 may transmit the content to the electronic device 200.

According to an embodiment, the electronic device 200 may output the content received from the server 100 (e.g., a URL (uniform resource locator), a banner, or a card) to a display. When the content is output, a user 600 may execute an operation associated with the content by touching the content. For example, the electronic device may process product-related payment or the like using the received content. For example, when the user 600 touches content including a URL, the electronic device 200 may access a website corresponding to the URL.

According to an embodiment, the beacon 300 may be a device capable of being wirelessly connected to the electronic device 200 and communicating with the electronic device 200. The beacon 300 may transmit beacon information to the electronic device 200 when the electronic device 200 is within a certain distance (e.g., about 70 m radius) from the beacon 300. The beacon information may include at least one of a type of the beacon 300, an ID of the beacon 300, a MAC address of the beacon 300, position information of the beacon 300, a URL, and status information of the beacon 300.

According to an embodiment, the website 400 may be a web server or database that stores data so as to always provide content to users of the website. Unlike the server 100, other users may also access the website 400 in addition to the service provider 500 and the user 600. For example, data stored in the website 400 may be received by not only the user 600 but also the other users. In addition, the data stored in the website 400 may be stored by the service provider 500 or may be stored by an administrator of the website 400.

According to an embodiment, the service provider 500 may be a person who provides services to the user 600. For example, the service provider 500 may directly store data in the server 100 to provide content to the user 600. The user 600 may receive the content from the server 100 and use the content. The service provider 500 may store data in the website 400. The server 100 may collect the data stored in the website 400 and transmit the data to the electronic device 200.

According to an embodiment, the service provider 500 may install the beacon 300 at a position in which the service provider 500 wants to provide services. When the electronic device 200 is located within a certain distance from the position at which the beacon 300 is installed, the electronic device 200 may receive beacon information. The electronic device 200, which has received the beacon information, may transmit the beacon information to the server 100. The server 100 may transmit content corresponding to the beacon information to the electronic device 200.

According to an embodiment, the content may be data which is to be provided to the user 600 by the service provider 500. For example, when the service provider 500 is a manager of an "A" clothing store, the content may include a banner of the "A" clothing store (e.g., a representative image of the "A" clothing store), a card provided by the "A" clothing store (e.g., a discount coupon), a notification provided by the "A" clothing store, or a URL of a home page of the "A" clothing store.

Figure 2:
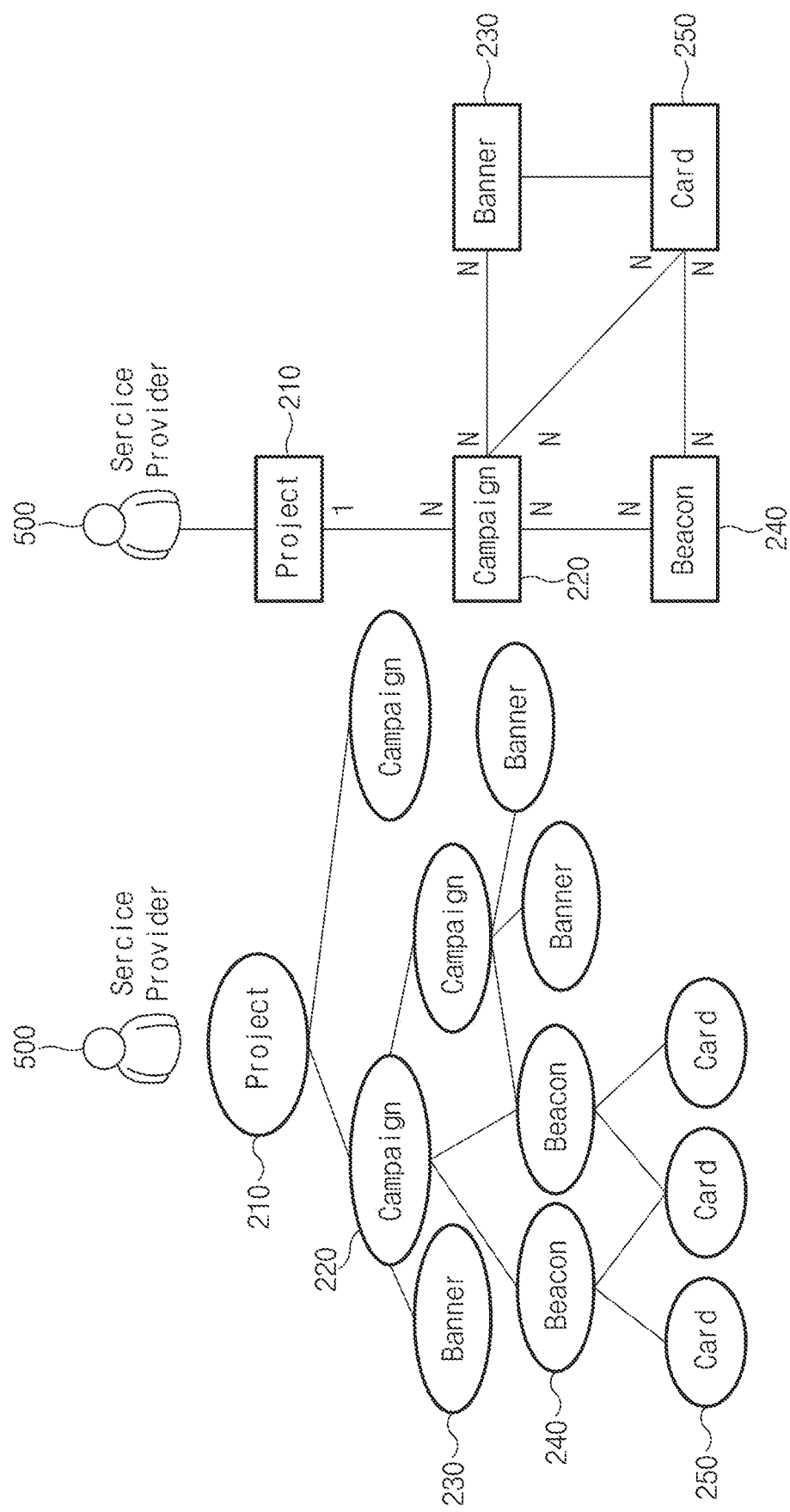
FIG. 2 illustrates a structure of data stored in a server according to an embodiment.

FIG. 2 illustrates a structure of data stored in a server according to an embodiment.

Referring to FIG. 2, the server 100 may store a project 210, a campaign 220, a banner 230, beacon information 240, and a card 250.

According to an embodiment, the project 210 may be the highest superordinate concept of a service that the service provider 500 intends to provide. For example, when the service provider 500 is a service manager at an "A" amusement park, the project 210 may include all the services performed in the A amusement park. The project 210 may include at least one campaign.

According to an embodiment, the campaign 220 may be a sub-item of a service which the service provider 500 intends to provide. For example, the campaign 220 may be a birthday discount campaign, a separate collection campaign, or the like. The campaign 220 may include at least one piece of beacon information or at least one card. The campaign 220 may announce information associated with the campaign 220 using at least one beacon. For example, when the separate collection campaign is held in an amusement park, the separate collection campaign may include beacon information of beacons installed next to trash cans among beacons installed in the amusement park. The separate collection campaign may include a card corresponding to the beacon information According to an embodiment, the beacon information 240 includes at least one of types of beacons, MAC addresses of beacons, position information of beacons, uniform resource locators (URLs), statuses of the beacons, and IDs of beacons. For example, the birthday discount campaign may include beacon information of beacons installed at the first to fourth ticket offices of the amusement park. The separate collection campaign may include beacon information of beacons respectively installed next to trash cans.

According to an embodiment, the card 250 may be data which an electronic device receives from a server and outputs to a display. The card 250 may include, for example, an image, a title, text, or a URL. The card 250 may correspond to beacon information of a beacon. For example, in a birthday discount campaign, the beacon information of a beacon installed at a first ticket office may include a discount coupon card and a message card that welcomes a visitor.

According to an embodiment, the banner 230 may be a large-sized image capable of delivering a message. The banner 230 may be an image corresponding to the campaign 220, which may be received from the server and is output to the display by an electronic device. An image included in the banner 230 may be larger in size than the image of the card 250. For example, in the case of the birthday discount campaign, an image into which the image of the A amusement park and a cake image are combined may be the banner 230. In the case of the separate collection campaign, the image into which the image of the A amusement park and an image of a trash are combined may be the banner 230. One campaign 220 may correspond to at least one banner 230.

Figure 3:
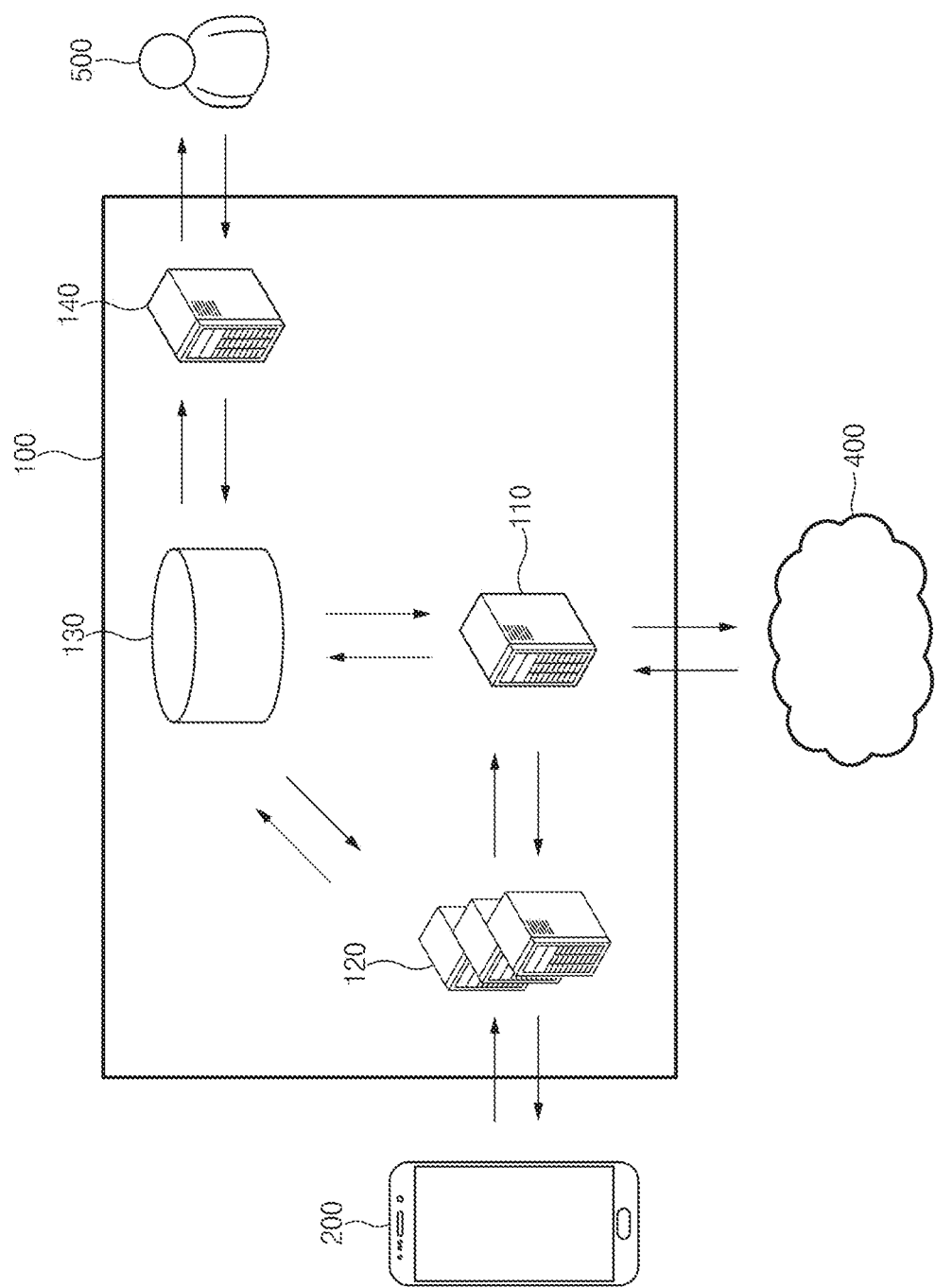
FIG. 3 illustrates a detailed block diagram of a server according to an embodiment.

FIG. 3 illustrates a detailed block diagram of a server according to an embodiment. In the disclosure, description given with reference to FIG. 1 may be applied to components having the same reference numerals as the components in FIG.

Referring to FIG. 3, at least one server 100 according to an embodiment may include for example, a first server 110 (e.g., a crawling server) and a second server 120 (e.g., REST API web server). The at least one server 100 according to the embodiment may include at least one processor, storage 130, and a dashboard 140.

According to an embodiment, when beacon information is received from the electronic device 200, the second server 120 may generate content having a structured document format based on data stored in the storage 130 and transmit the content to the electronic device 200. For example, the second server 120 may receive the beacon information from the electronic device 200. When the beacon information is received, the second server 120 may perform search to determine whether data included in the beacon information and corresponding to the beacon information is stored in the storage 130. When relevant data is found, the second server 120 may generate content having a structured document format based on the found data and transmit the content to the electronic device 200. When the data corresponding to the beacon information is not stored in the storage 130, the second server 120 may transmit URL information included in or corresponding to the beacon information to the first server 110.

According to an embodiment, the first server 110 may crawl the website 400 in the website 400 corresponding to a URL and collect data. When data, collected by crawling the website 400, is gathered, the first server 110 may store data collected by crawling the website 400, in the storage 130. The first server 110 may transmit the data collected by crawling the website 400 to the second server 120.

According to an embodiment, the second server 120 may generate content having a structured document format based on the data collected by crawling the website 400. For example, the second server 120 may generate content with JSON format based on the data collected by crawling the website 400 (may generate content with xml format, html format, and php format). The structured format content may include information on the project illustrated in FIG. 2, filtering information of a beacon, relationship between the beacon and the project, and the banner 230, and the card 250. When the content having a structured document format is generated, the second server 120 may transmit the content having a structured document format to the electronic device 200.

According to an embodiment, the dashboard 140 may be a system capable of allowing the service providers 500 to input data related with a service (e.g., projects, campaigns, beacon information, cards, banners, etc.) to the server 100. For example, when the service provider 500 accesses the server 100 through another electronic device (e.g., PC) and inputs data, the dashboard 140 may obtain the data input by the service provider 500. When the dashboard 140 obtains the data, the storage 130 may store the obtained data.

According to an embodiment, operations performed by the first server 110, the second server 120, the dashboard 140, and the storage 130 may be respectively performed by individual servers.

Figure 4:
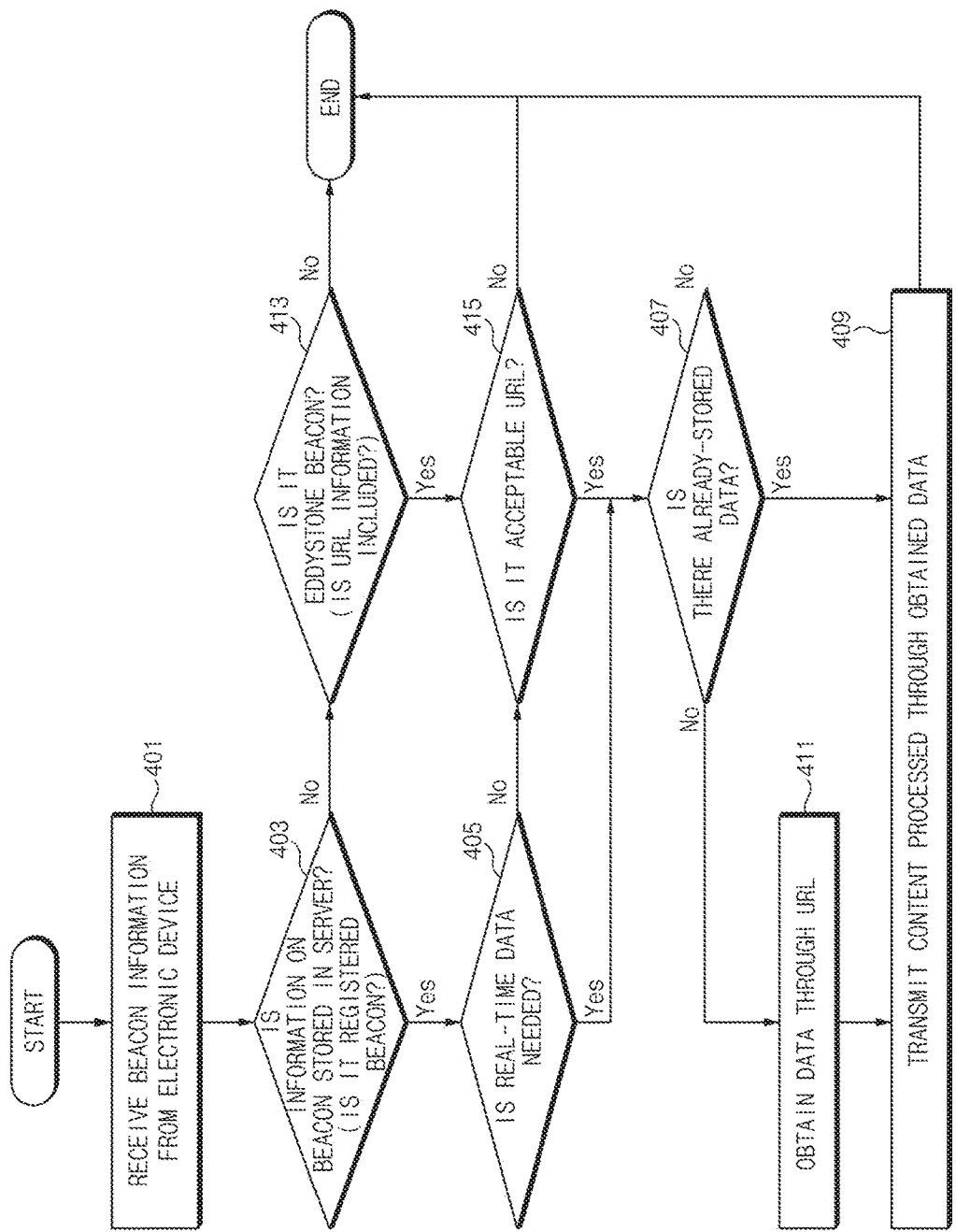
FIG. 4 illustrates a flowchart of operation of a server according to an embodiment.

FIG. 4 illustrates a flowchart of operation of a server according to an embodiment. The operational flowchart illustrated in FIG. 4 may be the operational flowchart of the server illustrated in FIG. 3.

Referring to FIG. 4, in operation 401, a server may receive beacon information from an electronic device. When beacon information is received, in operation 403, the server may determine whether the received beacon information is stored in the storage. When it is determined that the beacon information is stored in the storage, in operation 405, the server may determine whether content to be transferred to the electronic device needs real-time data. When the real-time data is needed, in operation 407, the server may determine whether there is stored data. When there is stored data, in operation 409, the server may generate content having a structured document format based on the stored data and transmit the content to the electronic device. When there is no data stored, in operation 411, the server may obtain data from a website corresponding to a URL. When data is obtained, in operation 409, the server may generate content having a structured document format based on the obtained data and transmit the content to the electronic device.

According to an embodiment, when the beacon information, received by the electronic device, is not stored in the storage, in operation 413, the server may determine whether a URL is included in the beacon information. For example, it may be determined whether the beacon is an eddystone beacon. When a URL is included in the beacon information, in operation 415, the server may determine whether the URL is an acceptable URL. For example, it may be determined whether the URL included in the beacon information belongs to a list of URLs designated to be impossible to access. When the URL included in the beacon information is an acceptable URL, in operation 407, the server may determine whether there is stored data. When there is the stored data, in operation 409, the server may generate content having a structured document format based on the stored data and transmit the content to the electronic device. When there is no data stored, in operation 411, the server may obtain data from a website corresponding to a URL. When data is obtained, in operation 409, the server may generate content having a structured document format based on the obtained data and transmit the content to the electronic device.

Figure 5:
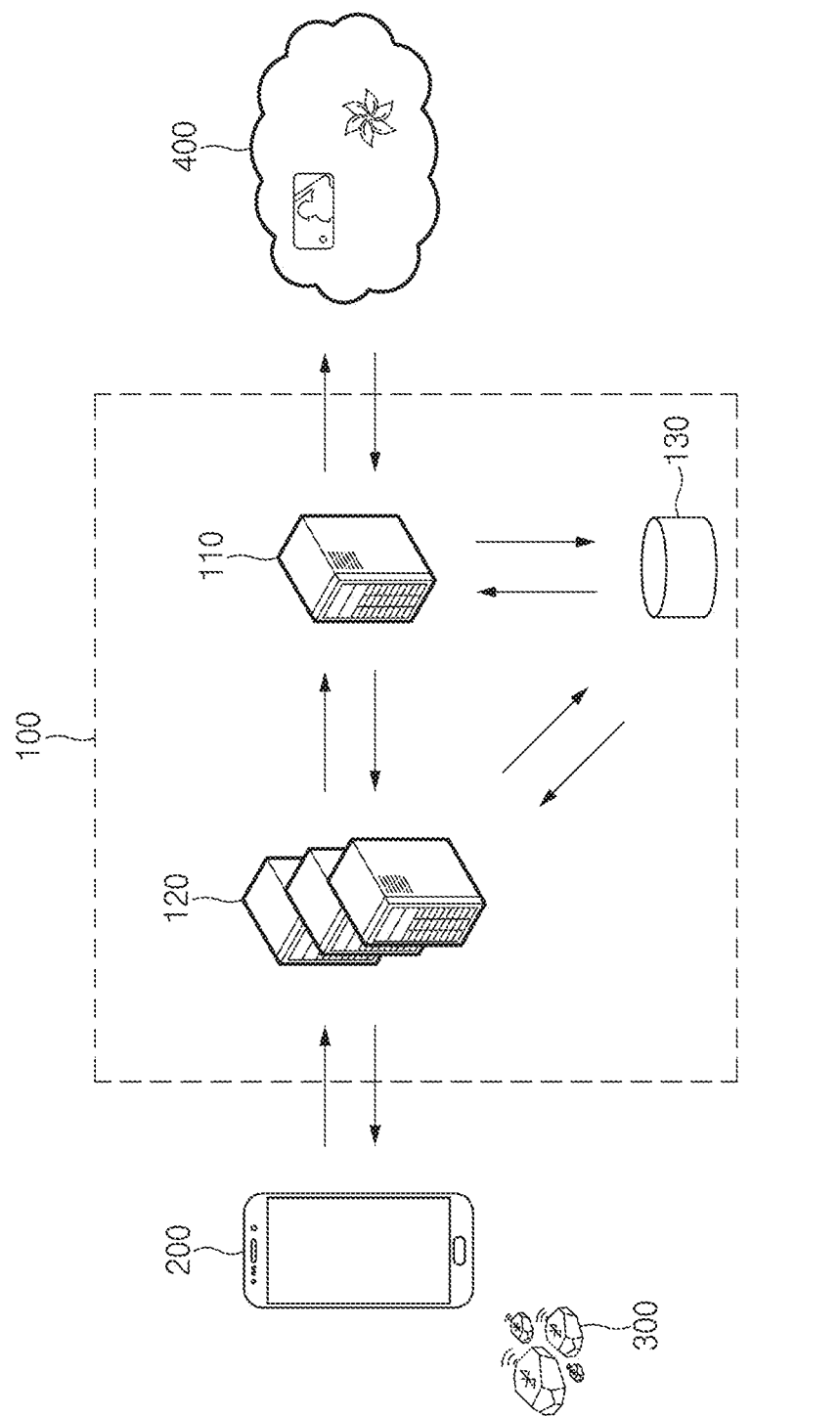
FIG. 5 illustrates a block diagram of a server that collects data in a website and transmits the data to an electronic device according to an embodiment.

FIG. 5 illustrates a block diagram of a server that collects data in a website and transmits the data to an electronic device according to an embodiment. The embodiment illustrated in FIG. 5 is an embodiment related to a case where there is a URL related with beacon information received from the electronic device.

Referring to FIG. 5, when the electronic device 200 transmits beacon information including a URL to the server 100, the second server 120 may receive the beacon information. When the beacon information is received, the second server 120 may determine whether data corresponding to the beacon information is stored in the storage 130.

According to an embodiment, when the data corresponding to the beacon information is stored in the storage 130, the second server 120 may generate content having a structured document format based on the data and transmit the content to the electronic device 200.

According to an embodiment, when content is not stored in the storage 130, the first server 110 may obtain data from the website 400 corresponding to a URL corresponding to the beacon information. The first server 110 may store the data obtained from the website 400 in the storage 130 and transmit the data to the second server 120. In another embodiment, the first server 110 may transmit the data to the second server 120 without storing the data in the storage 130. When the data is transmitted to the second server 120, the second server 120 may transmit the content having a structured document format, generated based on the data, to the electronic device 200.

Figure 6:
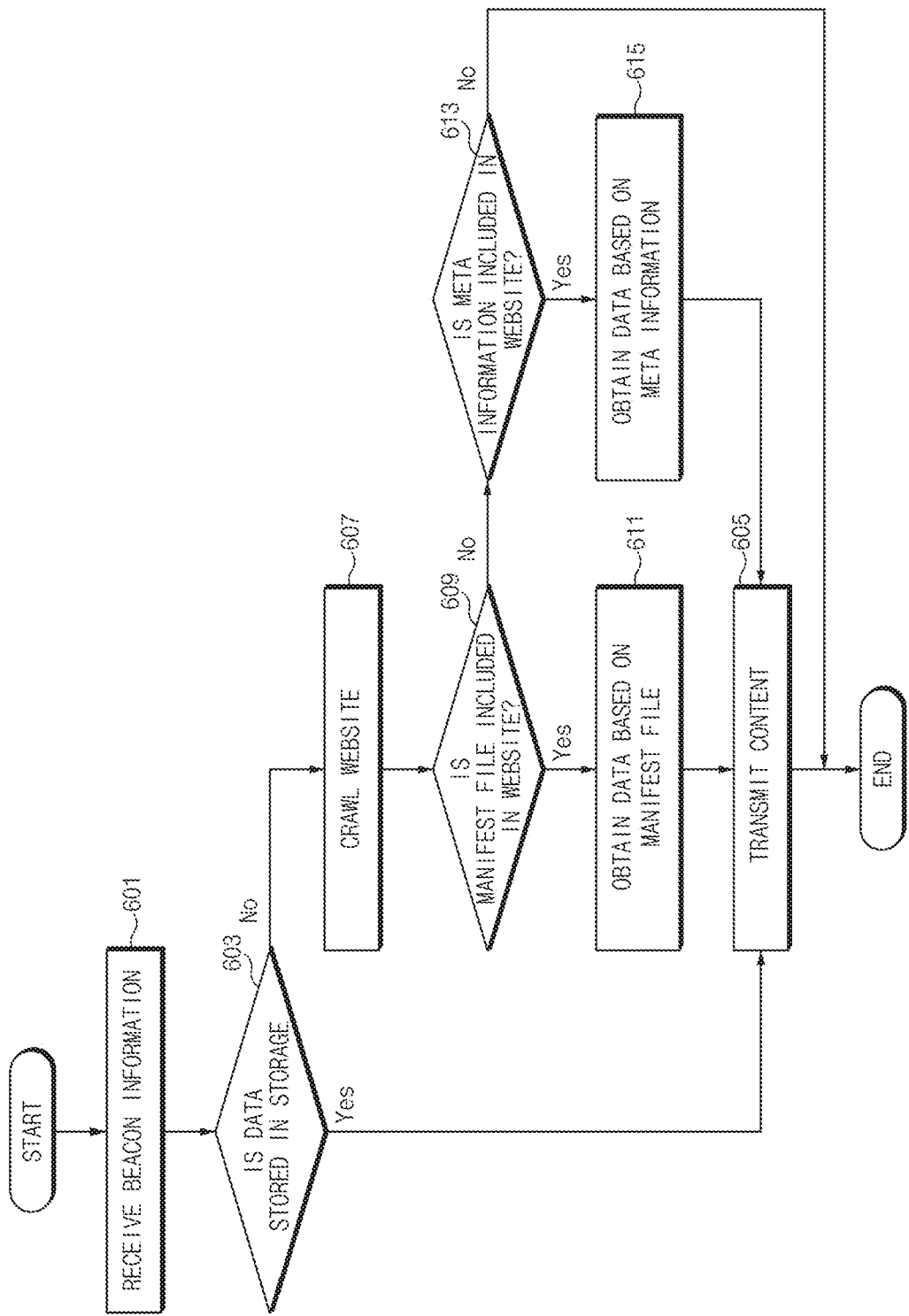
FIG. 6 illustrates an operational flowchart of a server that collects data in a website and transmits the data to an electronic device in a website according to an embodiment.

FIG. 6 illustrates an operational flowchart of a server that collects data in a website and transmits the data to an electronic device according to an embodiment. The operational flowchart in FIG. 6 may be the operational flowchart of the server illustrated in FIG. 5.

Referring to FIG. 6, in operation 601, a server may receive beacon information from an electronic device. The beacon information received by the server may include a URL. A URL corresponding to the received beacon information may be stored in storage. When the beacon information is received, in operation 603, the server may determine whether data corresponding to the beacon information is stored in the storage. When it is determined that the data is stored, in operation 605, the server may transmit content generated based on the data to the electronic device. According to an embodiment, the server may transmit content having a structured document format, generated based on the data, to the electronic device.

When it is determined that the data corresponding to the beacon information is not stored in the storage, in operation 607, the server may crawl a website corresponding to the URL related with the beacon information. When the website is crawled, in operation 609, the server may determine whether a manifest file is included in the website. For example, the manifest file (e.g., source code) may be a file associated with execution of content. When the manifest file is included in the website, in operation 611, the server may obtain data based on the manifest file. In operation 605, the server may generate content based on the obtained data and transmit the content to the electronic device.

According to an embodiment, when the manifest file is not included in the website, in operation 613, the server may determine whether meta information is included in the website. The meta information may be, for example, information for identifying the website. For example, the meta information may include the name of the website, a representative icon of the website, a description of the website, or a representative image of the website or the like. When the meta information is included in the website, in operation 615, the server may obtain data based on the meta information. In operation 605, the server may generate content based on the obtained data and transmit the content to the electronic device. When the meta information is not included in the website in operation 613, the server may determine that there is no data and terminate its operation.

Figure 7:
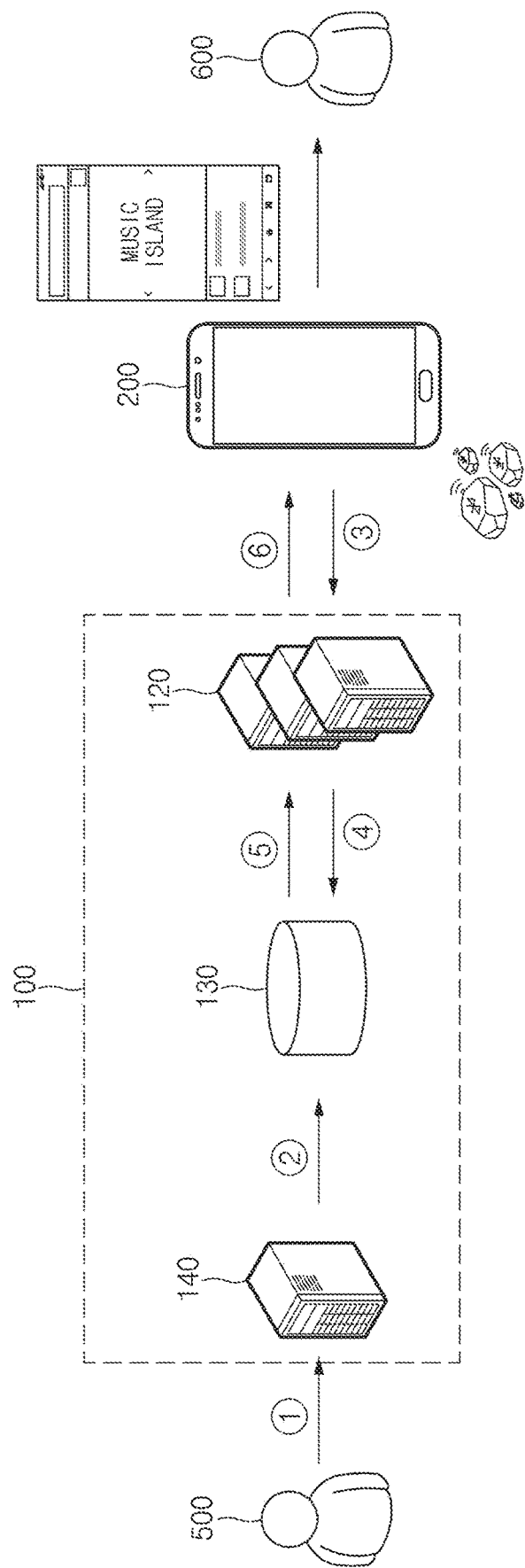
FIG. 7 illustrates a block diagram of a server that transmits content generated based on data stored in storage to an electronic device according to an embodiment.

FIG. 7 illustrates a block diagram of a server that transmits content generated based on data stored in storage to an electronic device according to an embodiment.

Referring to FIG. 7, the dashboard 140 may obtain data based on an input of the service provider 500. For example, when the service provider 500 accesses the server 100 through another electronic device (e.g., a PC) and inputs data, the dashboard 140 may obtain the data input by the service provider 500. The storage 130 may store the data obtained from the dashboard 140.

According to an embodiment, when the electronic device 200 transmits beacon information to at least one server 100, the second server 120 may receive the beacon information. When the beacon information is received, the second server 120 may determine whether data corresponding to the beacon information is stored in the storage 130. For example, when the beacon is a beacon installed in an "A" clothing store, the second server 120 may determine whether data related with the "A" clothing store is stored in the storage 130. When it is determined that there is the data corresponding to the beacon information, the second server 120 may transmit content generated based on the data related with the beacon information to the electronic device 200.

Figure 8:
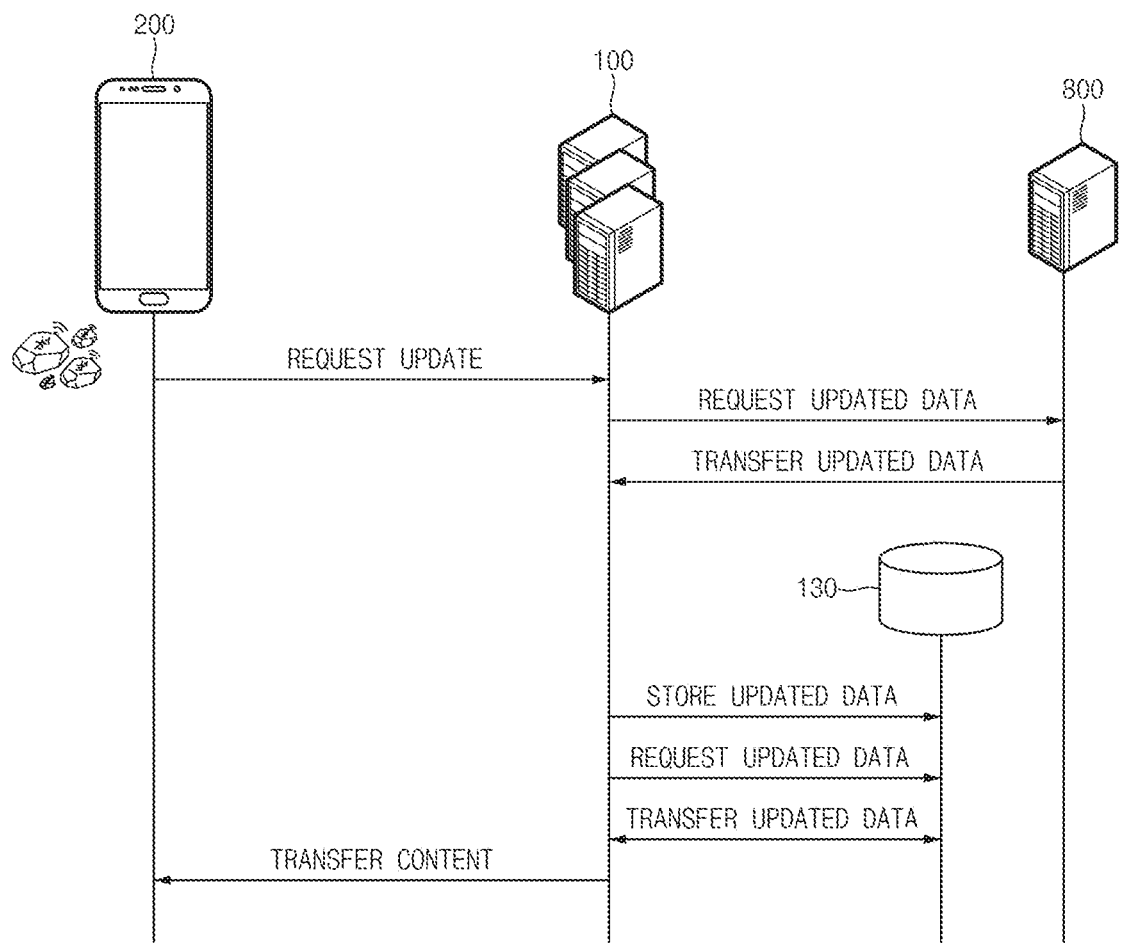
FIG. 8 illustrates a server that updates data stored in storage according to an embodiment.

FIG. 8 illustrates a server that updates data stored in storage according to an embodiment.

Referring to FIG. 8, at least one server 100 according to an embodiment may collect updated data in response to reception of information for updating content from the electronic device 200. For example, the server 100 may obtain updated data from an external server 800 (or website with reference to FIG. 1). The server 100 may obtain updated data, input by the service provider through the dashboard. For example, the information for updating the content may be an update request signal from content stored in the electronic device or beacon information received from a beacon by the electronic device 200.

According to an embodiment, when the updated data is obtained, the at least one server 100 may update data stored in the storage 130 using the updated data. For example, when beacon information is received from the electronic device 200, the server 100 may transmit content generated based on the updated data to the electronic device 200. According to an embodiment, the at least one server 100 may transmit the content generated based on the updated data to the electronic device 200 without storing the updated data in the storage 130. According to an embodiment of the disclosure, the electronic device 200 may receive the updated content by transmitting information for updating content to the server 100.

According to an embodiment, the electronic device 200 may store the content received from the server 100. The electronic device 200 may transmit the received information for updating content to the server 100, and receive the updated version of the content stored in the electronic device from the server 100. For example, the electronic device 200 may store a card for a "B" ride in the A amusement park. In a case where the card for the "B" ride is stored, even when the electronic device 200 is not adjacent to the "B" ride (e.g., is located at a position at which the beacon information may not be received), the user may update card information for the "B" ride through the electronic device 200. For example, the user may request the server 100 to update the card through the electronic device 200, and the server 100 may transmit information, such as a waiting time or an operation hour, to the electronic device 200. Alternatively, the server 100 may transmit the updated card including information, such as a waiting time or an operation hour, to the electronic device 200.

Figure 9:
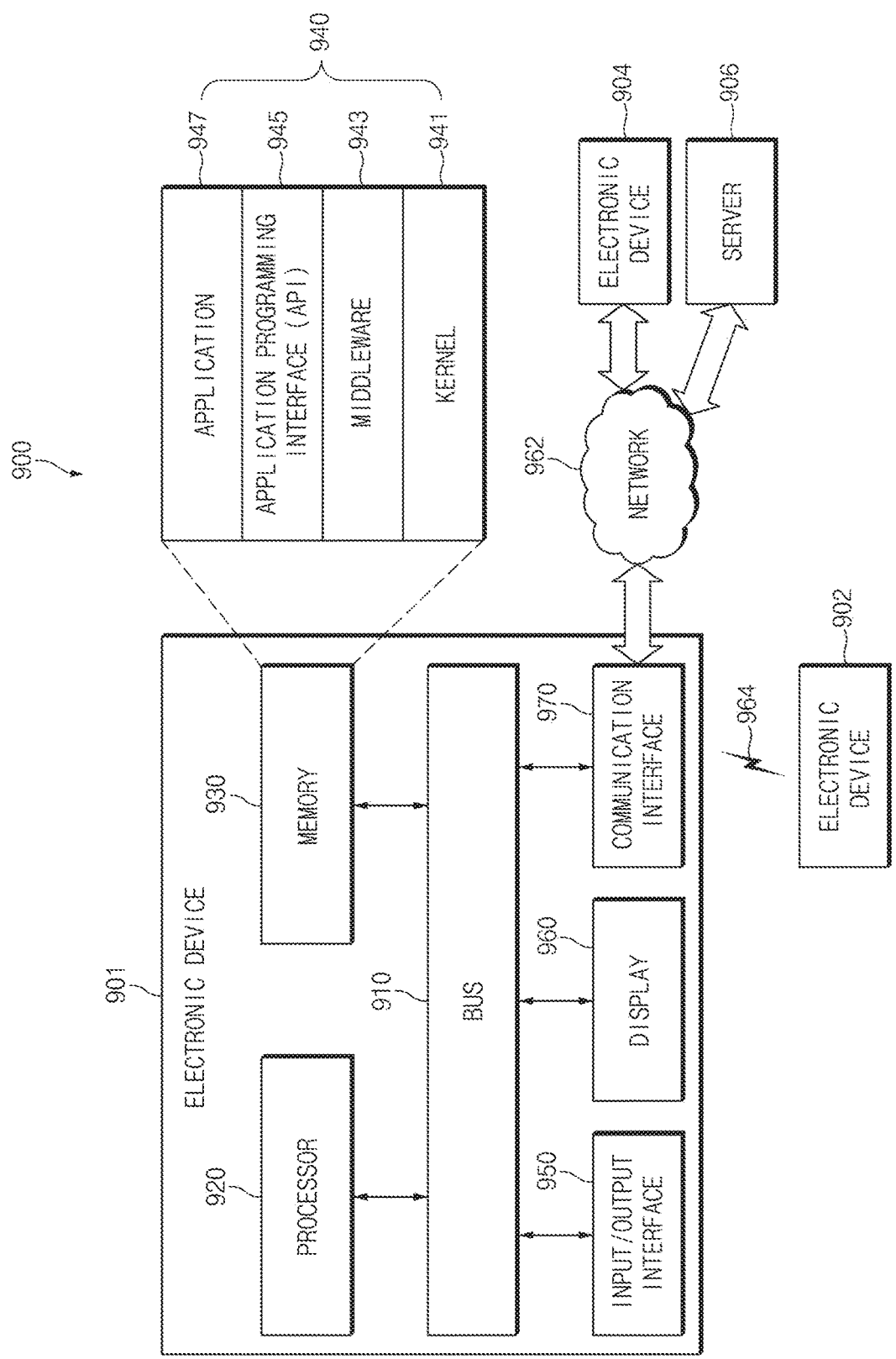
FIG. 9 illustrates an electronic device in a network environment according to various embodiments.

FIG. 9 illustrates an electronic device in a network environment, according to various embodiments. For example, the electronic device illustrated in FIG. 9 may correspond to the electronic device 200 illustrated in FIG. 1.

Referring to FIG. 9, according to various embodiments, an electronic device 901, a first electronic device 902, a second electronic device 904, or a server 906 may be connected each other over a network 962 or a short range communication 964. The electronic device 901 may include a bus 910, a processor 920, a memory 930, an input/output interface 950, a display 960, and a communication interface 970. According to an embodiment, the electronic device 901 may not include at least one of the above-described components or may further include other component(s).

For example, the bus 910 may interconnect the above-described components 910 to 970 and may include a circuit for conveying communications (e.g., a control message and/or data) among the above-described components.

The processor 920 may include one or more of a central processing unit (CPU), an application processor (AP), or a communication processor (CP). For example, the processor 920 may perform an arithmetic operation or data processing associated with control and/or communication of at least other components of the electronic device 901.

The memory 930 may include a volatile and/or nonvolatile memory. For example, the memory 930 may store commands or data associated with at least one other component(s) of the electronic device 901. According to an embodiment, the memory 930 may store software and/or a program 940. The program 940 may include, for example, a kernel 941, a middleware 943, an application programming interface (API) 945, and/or an application program (or "an application") 947. At least a part of the kernel 941, the middleware 943, or the API 945 may be referred to as an "operating system (OS)".

For example, the kernel 941 may control or manage system resources (e.g., the bus 910, the processor 920, the memory 930, and the like) that are used to execute operations or functions of other programs (e.g., the middleware 943, the API 945, and the application program 947). Furthermore, the kernel 941 may provide an interface that allows the middleware 943, the API 945, or the application program 947 to access discrete components of the electronic device 901 so as to control or manage system resources.

The middleware 943 may perform, for example, a mediation role such that the API 945 or the application program 947 communicates with the kernel 941 to exchange data.

Furthermore, the middleware 943 may process task requests received from the application program 947 according to a priority. For example, the middleware 943 may assign the priority, which makes it possible to use a system resource (e.g., the bus 910, the processor 920, the memory 930, or the like) of the electronic device 901, to at least one of the application program 947. For example, the middleware 943 may process the one or more task requests according to the priority assigned to the at least one, which makes it possible to perform scheduling or load balancing on the one or more task requests.

The API 945 may be, for example, an interface through which the application program 947 controls a function provided by the kernel 941 or the middleware 943, and may include, for example, at least one interface or function (e.g., an instruction) for a file control, a window control, image processing, a character control, or the like.

The input/output interface 950 may play a role, for example, of an interface which transmits a command or data input from a user or another external device, to other component(s) of the electronic device 901. Furthermore, the input/output interface 950 may output a command or data, received from other component(s) of the electronic device 901, to a user or another external device.

The display 960 may include, for example, a liquid crystal display (LCD), a light-emitting diode (LED) display, an organic LED (OLED) display, a microelectromechanical systems (MEMS) display, or an electronic paper display. The display 960 may display, for example, various contents (e.g., a text, an image, a video, an icon, a symbol, and the like) to a user. The display 960 may include a touch screen and may receive, for example, a touch, gesture, proximity, or hovering input using an electronic pen or a part of a user's body.

For example, the communication interface 970 may establish communication between the electronic device 901 and an external device (e.g., the first electronic device 902, the second electronic device 904, or the server 906). For example, the communication interface 970 may be connected to the network 962 over wireless communication or wired communication to communicate with the external device (e.g., the second electronic device 904 or the server 906).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 964. The short range communication 964 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 901 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 962 may include at least one of telecommunications networks, for example, a computer network (e.g., LAN or WAN), an Internet, or a telephone network.

Each of the first and second electronic devices 902 and 904 may be a device of which the type is different from or the same as that of the electronic device 901. According to an embodiment, the server 906 may include a group of one or more servers. According to various embodiments, all or a portion of operations that the electronic device 901 will perform may be executed by another or plural electronic devices (e.g., the first electronic device 902, the second electronic device 904 or the server 906). According to an embodiment, in the case where the electronic device 901 executes any function or service automatically or in response to a request, the electronic device 901 may not perform the function or the service internally, but, alternatively additionally, it may request at least a portion of a function associated with the electronic device 901 from another device (e.g., the electronic device 902 or 904 or the server 906). The other electronic device may execute the requested function or additional function and may transmit the execution result to the electronic device 901. The electronic device 901 may provide the requested function or service using the received result or may additionally process the received result to provide the requested function or service. To this end, for example, cloud computing, distributed computing, or client-server computing may be used.

Figure 10:
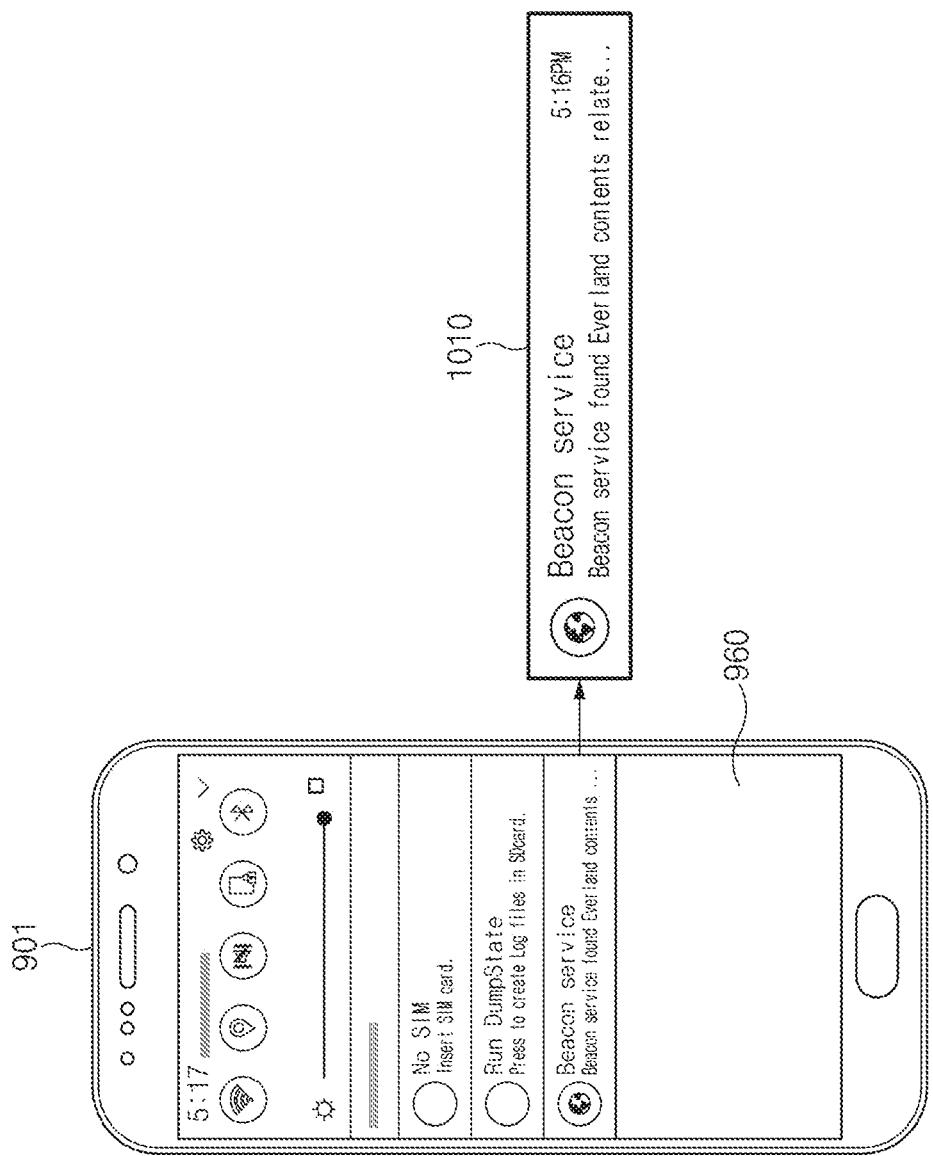
FIG. 10 illustrates an electronic device that outputs a notification indicating reception of content to a display according to an embodiment.

FIG. 10 illustrates an electronic device that outputs a notification indicating reception of content to a display according to an embodiment. In the disclosure, the description given with reference to FIG. 9 may be applied to components having the same reference numerals as the components in FIG. 9. The at least one processor described with reference to FIGS. 1 to 8 may be a processor included in the server, and the at least one processor 920 to be described below may be a processor included in the electronic device. Therefore, the two processors may differ from each other.

Referring to FIG. 10, when a beacon is found, the at least one processor 920 (e.g., AP or CP) of the electronic device 900 may transmit beacon information associated with the found beacon to the server. When the beacon information is transmitted, the at least one processor 920 may receive content corresponding to the transmitted beacon information from the sever. When the content is received from the server, the at least one processor 920 may output the content to the display 960.

According to an embodiment, the at least one processor 920 may output a notification 1010 indicating reception of the content, in response to the reception of the content to the display 960. The notification 1010 may include the beacon information, a banner, a card, and a URL-related contents. According to an embodiment, when at least one campaign belonging to one project is found, the at least one processor 920 may output one or a plurality of notifications 1010 for each campaign.

Figure 11:
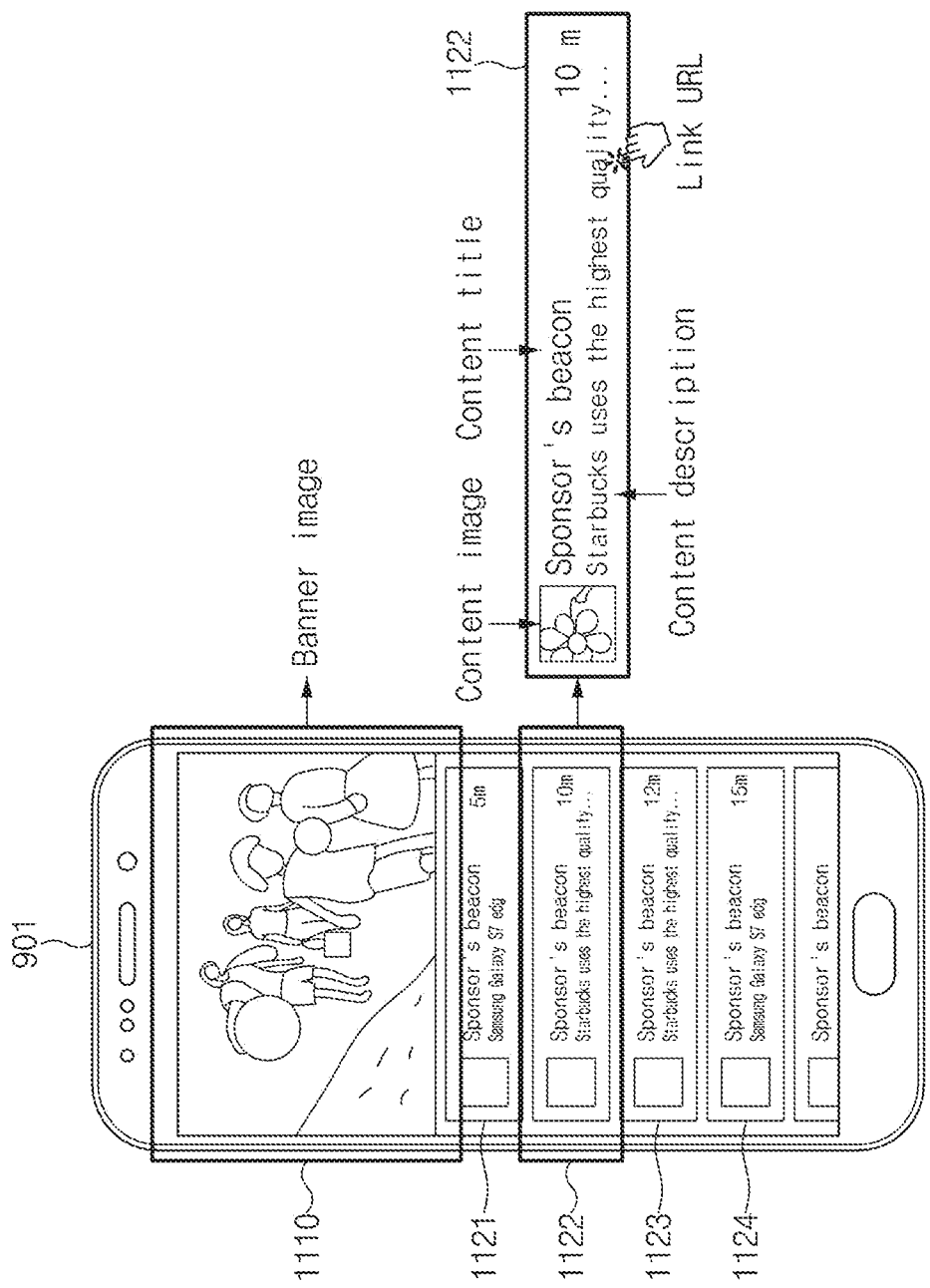
FIG. 11 illustrates an electronic device that outputs content according to an embodiment.

FIG. 11 illustrates an electronic device that outputs content according to an embodiment. The embodiment illustrated in FIG. 11 is an embodiment related to operation after a user touches the notification illustrated in FIG. 10.

Referring to FIG. 11, when the electronic device (e.g., the electronic device 901 illustrated in FIG. 9) detects an input for the notification, output to the display 960, the at least one processor 920 may output a banner 1110 related to the notification and/or cards 1121, 1122, 1123 and 1124 to a display. When a plurality of banners 1110 and/or the cards 1121, 1122, 1123 and 1124 are found, the at least one processor 920 may output at least one of the plurality of banners 1110 and/or the card 1121, 1122, 1123 and 1124.

The at least one processor 920 may sequentially output, for example, the plurality of banners 1110 and/or the card 1121, 1122, 1123 and 1124. According to an embodiment, the at least one processor 920 may output only the card 1121 to the display. In another embodiment, the at least one processor 920 may output the card 1121, the card 1122, and the card 1123 to the display in their order according to a distance between the electronic device 901 and a beacon.

According to an embodiment, each of the cards 1121, 1122, 1123 and 1124 may include at least one of an image of a service, beacon information, contents of the service, and a URL. The image of the service may be an image different from the banner, and may be, for example, an image of a coupon provided to the user of the electronic device 901. The beacon information may include an ID of the beacon, the distance between the electronic device 901 and the beacon, and the like.

According to an embodiment, when an input for a notification output to the display is detected, the at least one processor 920 may execute an application capable of receiving information associated with the banner 1110 and/or the cards 1121, 1122, 1123, and 1124. In a case where a URL is included in the notification, when an input for the notification is detected, the at least one processor 920 may allow the electronic device 901 to be connected to a website corresponding to the URL. When the electronic device 901 is connected to the website, the at least one processor 920 may receive content from the website.

Figure 12:
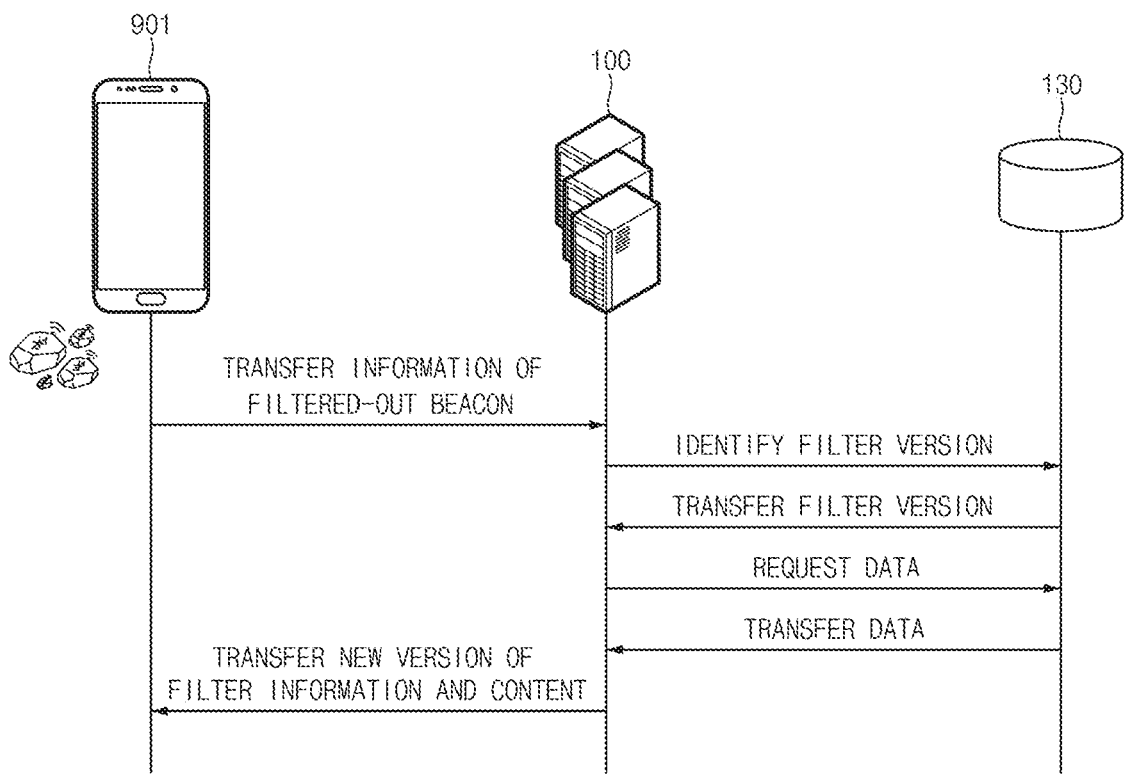
FIG. 12 illustrates an electronic device and a server which filter out a beacon associated with content from among at least one beacon capable of communicating with the electronic device according to an embodiment.

FIG. 12 illustrates an electronic device and a server which filter out a beacon associated with content from among at least one beacon capable of communicating with the electronic device according to an embodiment.

Referring to FIG. 12, the electronic device 901 may include a filter. According to an embodiment, the filter may filter out a beacon not capable of providing content from among beacons that have transmitted beacon information. For example, the server 100 may transmit beacon information corresponding to content stored in the storage 130 to the electronic device 901. When the beacon information received from the beacon by the electronic device 901 is identical to the beacon information corresponding to the content, the electronic device 901 may filter out the beacon.

When the beacon is filtered out, the electronic device 901 may transmit only the beacon information of the beacon that is filtered out to the server 100.

According to an embodiment, the electronic device 901 may transmit a version of the filter to the server 100. For example, the electronic device 901 may transfer the beacon information and the version of the filter to the server. When the version of the filter is transferred to the server 100, the server 100 may determine whether the version of the filter needs to be updated. When the version of the filter needs to be updated, the server 100 may transmit content or filter information of a new version to the electronic device 901. When the version of the filter does not need to be updated, the server 100 may transmit only content to the electronic device 901.

Figure 13A:
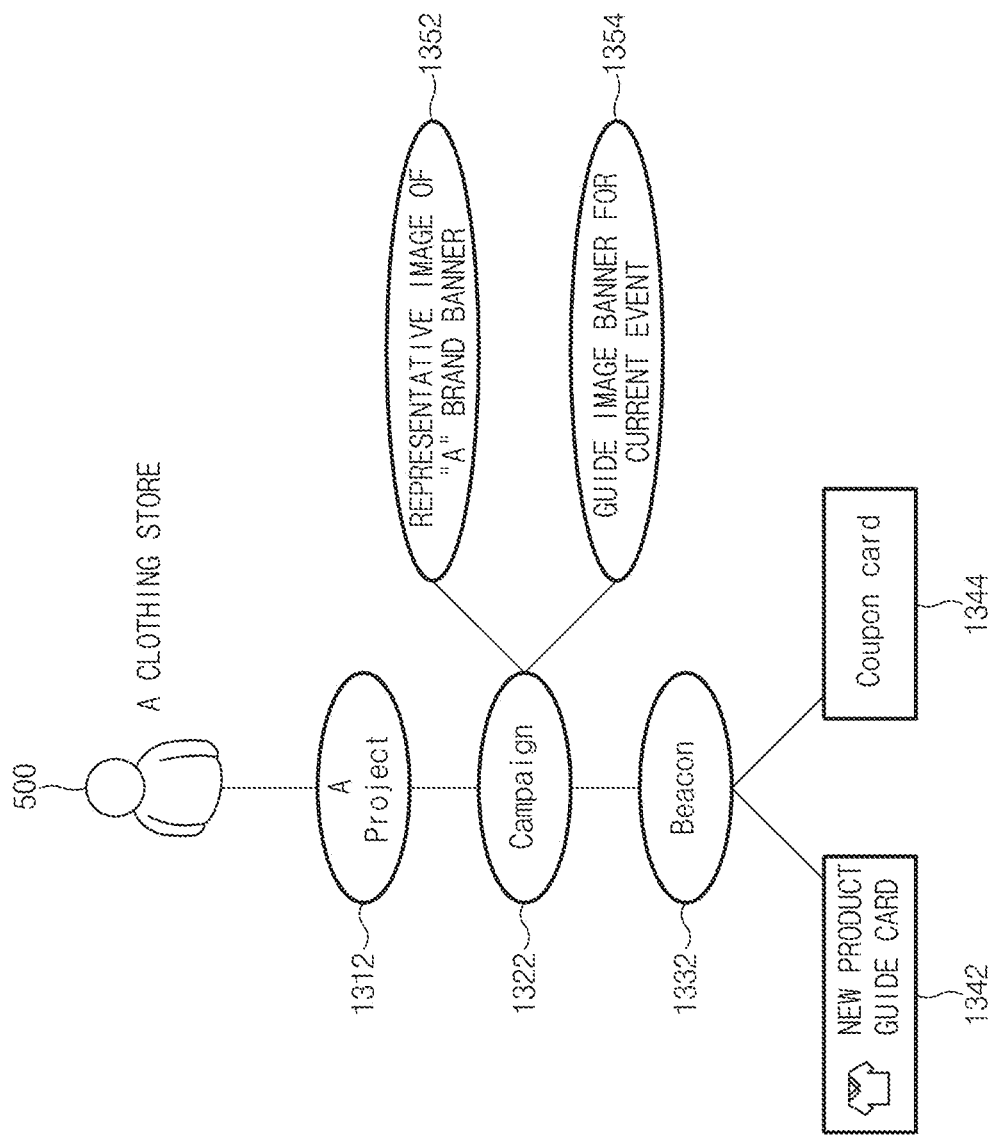
FIG. 13A illustrates a data structure of content which is to be provided by a service provider according to an embodiment.
Figure 13B:
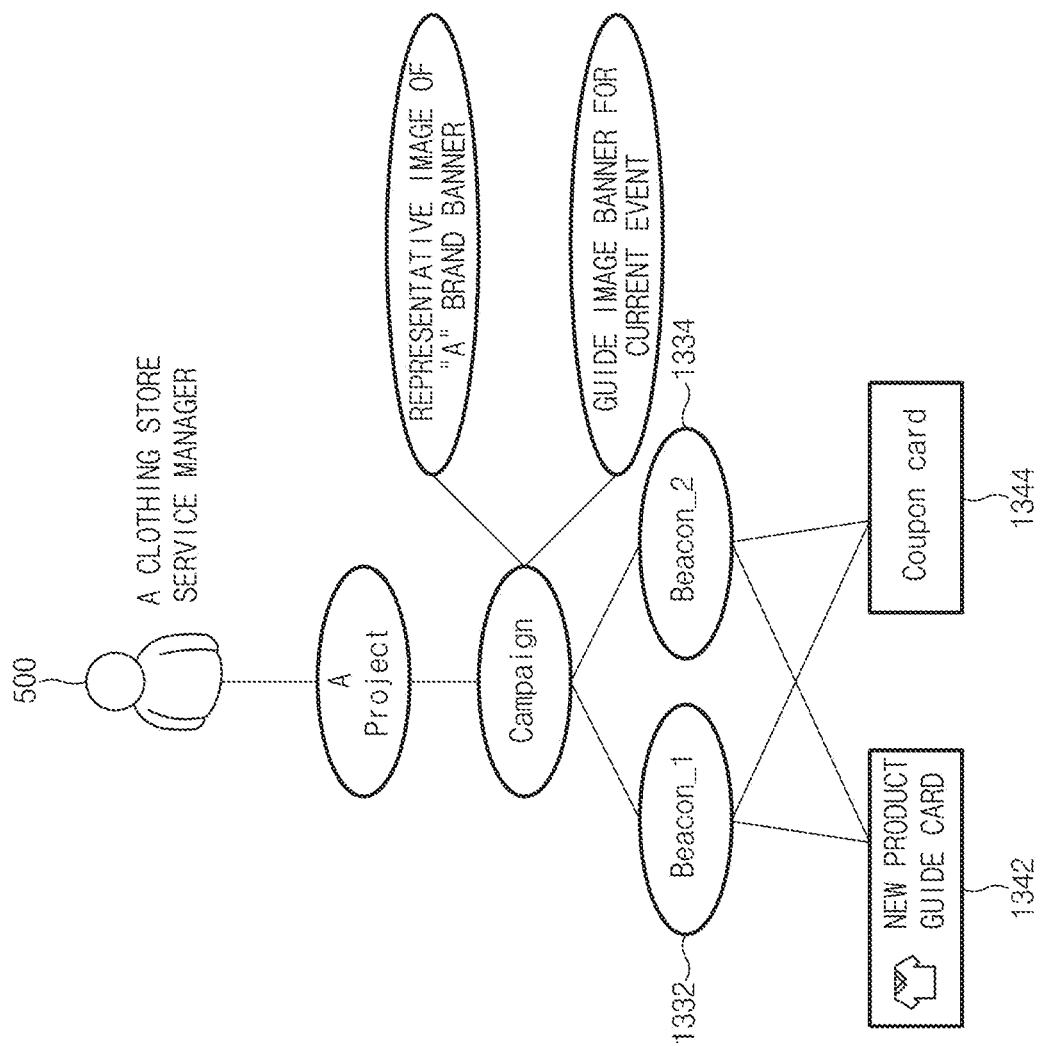
FIG. 13B illustrates a data structure in the case of adding a beacon according to an embodiment.
Figure 13C:
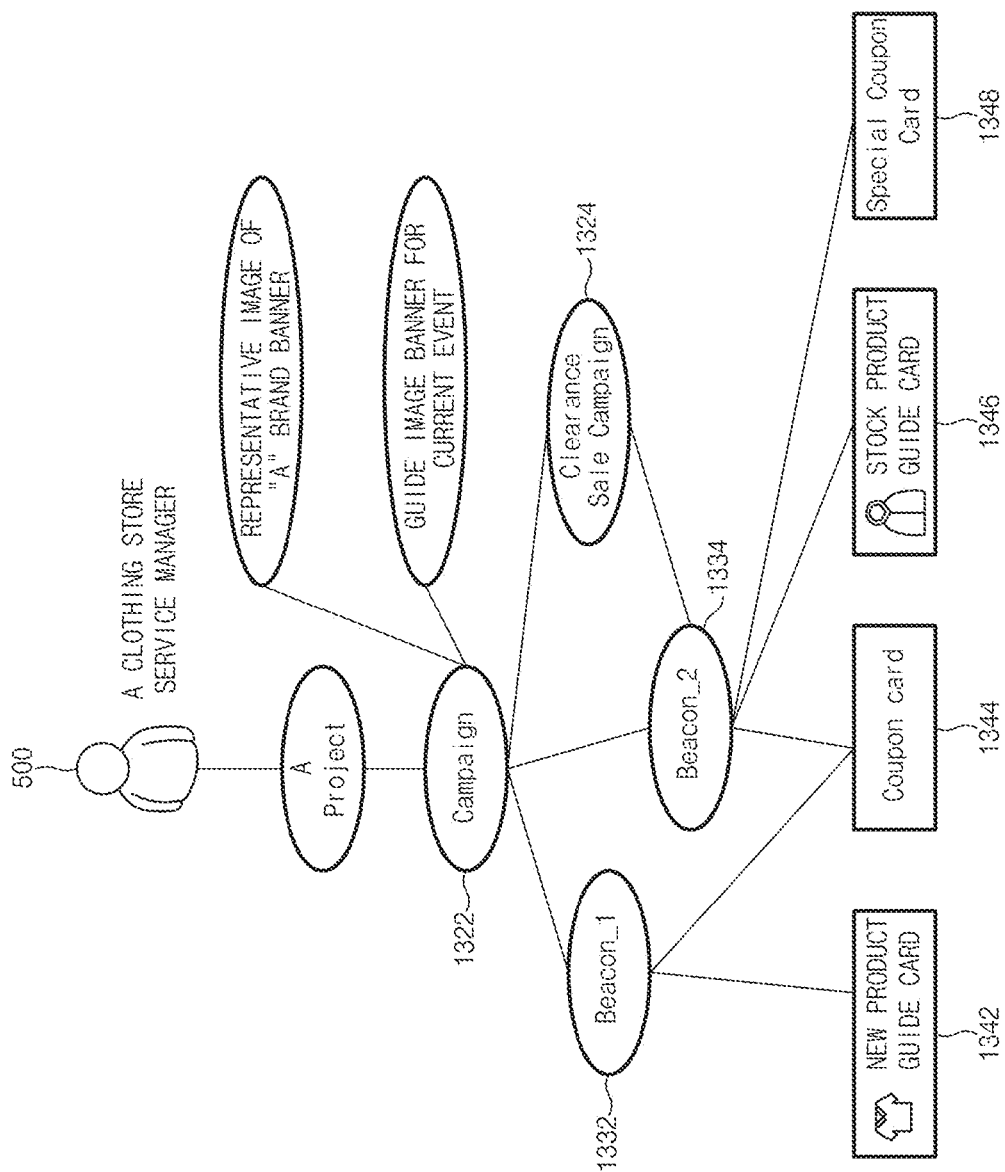
FIG. 13C illustrates a data structure in the case of adding a campaign according to an embodiment.

FIG. 13A illustrates a data structure of content which a service provider intends to provide according to an embodiment. FIG. 13B illustrates a data structure in the case of adding a beacon according to an embodiment. The embodiment illustrated in FIG. 13B is an embodiment related to a case in which a beacon is added in FIG. 13A. FIG. 13C illustrates a data structure in the case of adding a campaign according to an embodiment. The embodiment illustrated in FIG. 13C is an embodiment related to a case in which a campaign is added in FIG. 13A.

Referring to FIG. 13A, the service provider 500 may be a service manager of the "A" clothing store, a project 1312 may be all services performed in the "A" clothing store, and a campaign 1322 may be sub-items of the services performed in the "A" clothing store. Beacon information 1332 may be information of a beacon installed in the "A" clothing store, cards 1342 and 1344 may be text and/or coupons provided by the "A" clothing store, and banners 1352 and 1354 may be images corresponding to services performed in the "A" clothing store. For example, when a new product discount service is performed in the "A" clothing store, the cards may include the new product guide card 1342, and/or the discount coupon card 1344. In addition, when a new product discount service is performed in the "A" clothing store, a banner may be the representative image 1352 of an A brand and/or the image 1354 related to the new product discount service.

Referring to FIG. 13B, as the "A" clothing store is expanded, the number of beacons may increase. For example, in a state where a first beacon has installed in a first zone of the "A" clothing store, a second beacon may be additionally installed in a second zone of the "A" clothing store. When the first zone is far from the second zone and the second beacon is not installed in the second zone, the electronic device may not receive content even through the electronic device is positioned in the second zone. Therefore, when the "A" clothing store is expanded, it may be necessary to additionally install a beacon in the extended area.

When a second beacon is installed in the "A" clothing store, beacon information 1334 of the second beacon may be registered in the server. When the beacon information 1334 of the second beacon is transmitted to the server, the same content as in a case in which the beacon information 1332 of the first beacon is transmitted to the server may be transmitted to the electronic device. For example, when the electronic device is positioned adjacent to the second zone, the beacon information 1334 of the second beacon is transmitted to the server, and the electronic device may receive the new product guide card 1342 and/or the discount coupon card 1344 from the server. According to an embodiment of the disclosure, it is possible to enlarge a range in which the same service as an existing service is provided by registering newly-added beacon information in the server.

Referring to FIG. 13C, the numbers of services being performed in the "A" clothing store may increase. For example, a clearance sale service may be additionally performed during the new product discount service in the "A" clothing store. A clearance sale campaign 1324 may be added to proceed with the clearance sale service. In addition, a second beacon may be installed near stock products to provide content related to the clearance sale service.

When the second beacon is installed near the stock products, the beacon information 1334 of the second beacon may be registered in the server. In addition, when the beacon information 1334 of the second beacon is transmitted to the server, the server may transmit a banner announcing a clearance sale event, a stock product guide card 1346, and/or a special discount coupon card 1348 to the electronic device. For example, when an electronic device is located adjacent to the stock products, the beacon information 1334 of the second beacon may be transmitted to the server and the electronic device may receive the banner and/or the cards 1346 and 1348 from the server. According to an embodiment of the disclosure, it is possible to provide a differentiated service from other services to a user by adding a beacon and registering information of the added beacon.

Figure 14A:
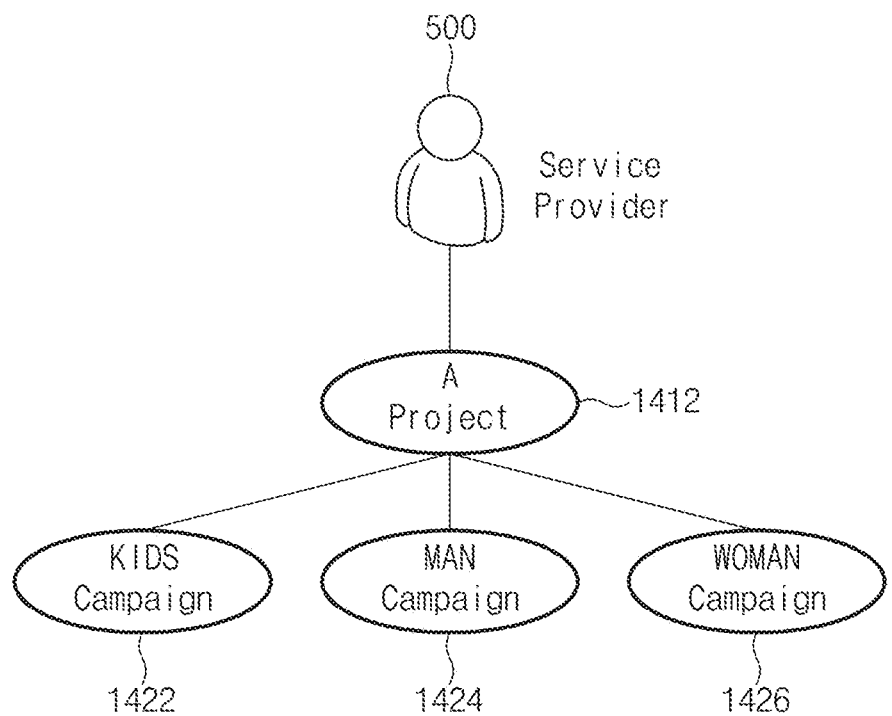
FIG. 14A illustrates a data structure of content which is to be provided by a service provider according to another embodiment.
Figure 14B:
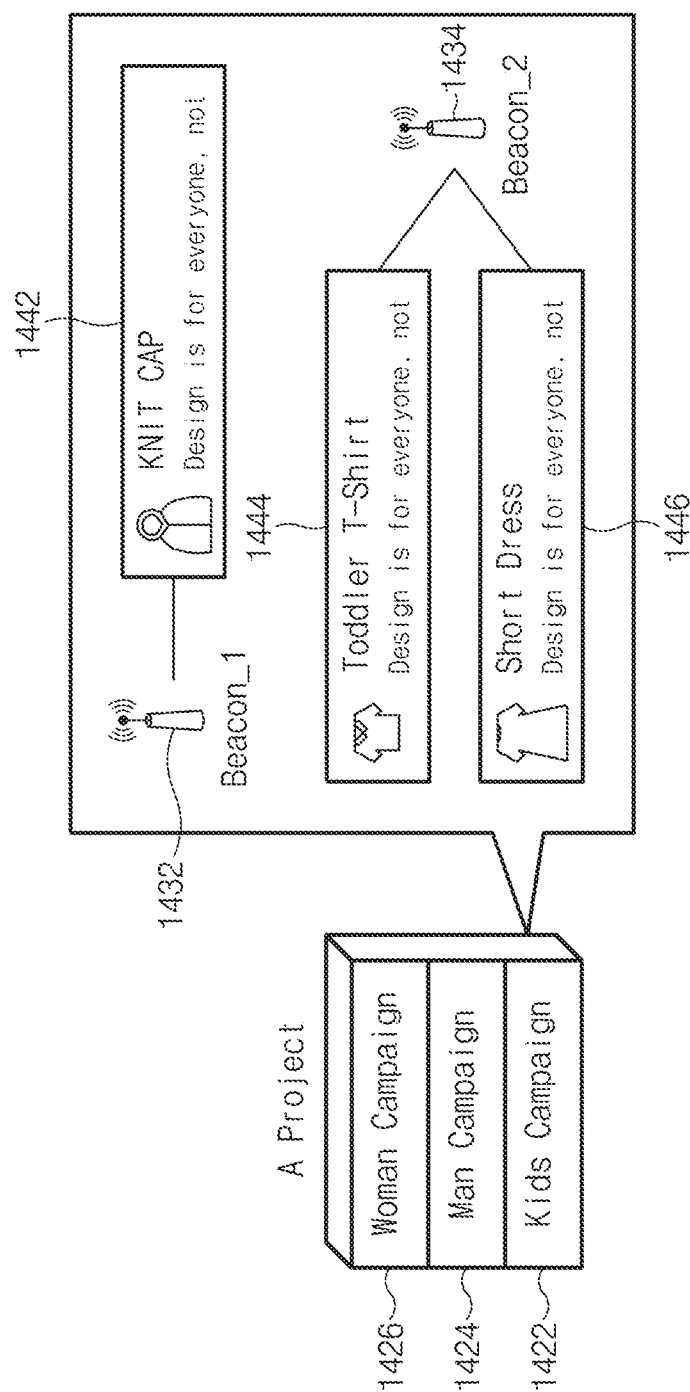
FIG. 14B illustrates beacon information and a card coupled to a campaign according to another embodiment.
Figure 14C:
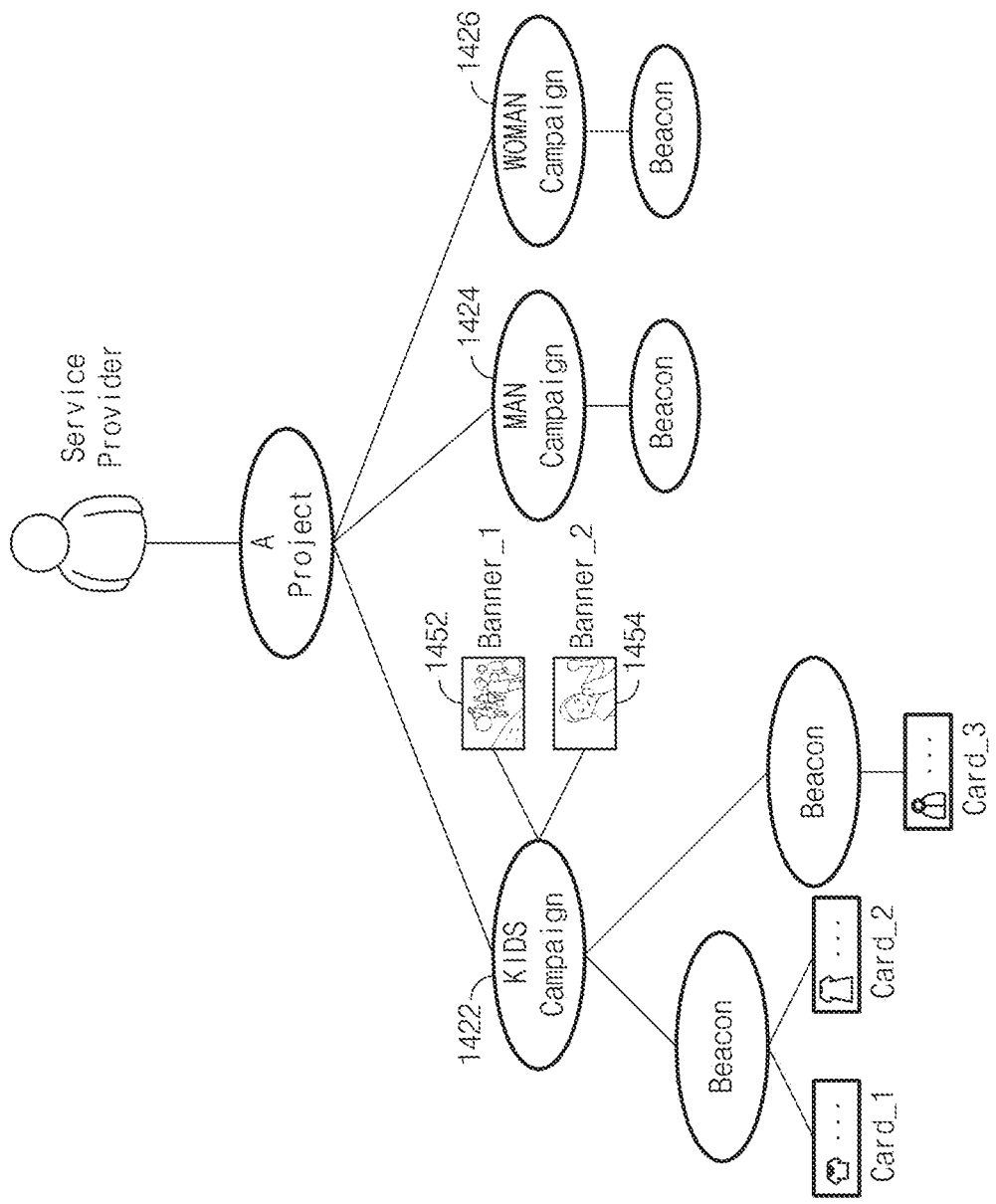
FIG. 14C illustrates a data structure in the case of adding a banner according to an embodiment.
Figure 14D:
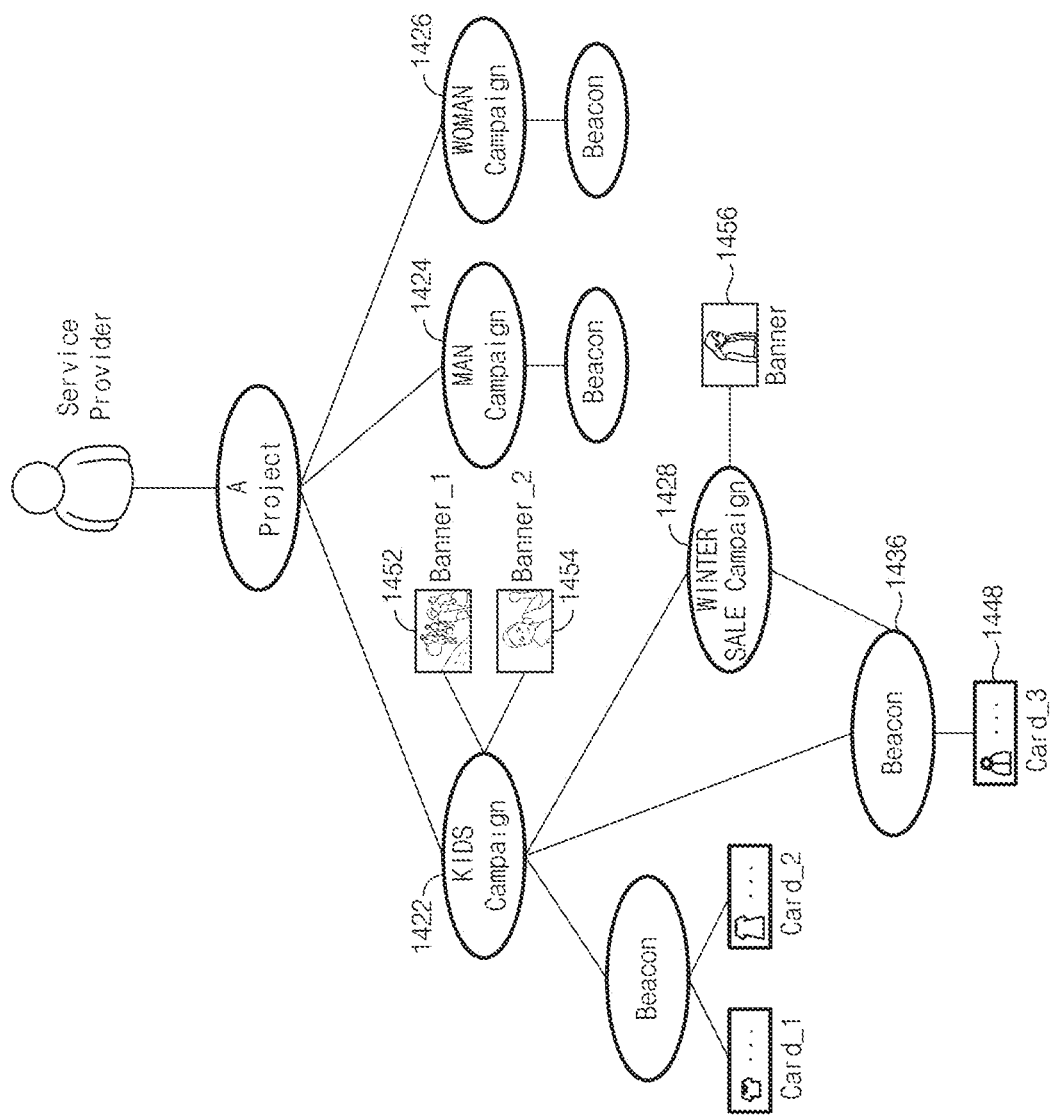
FIG. 14D illustrates a data structure in the case of adding a campaign according to another embodiment.

FIG. 14A illustrates a data structure of content which is to be provided by a service provider according to another embodiment, and FIG. 14B illustrates beacon information and a card coupled to a campaign according to another embodiment. An embodiment illustrated in FIG. 14B shows beacon information and a card connected to a campaign illustrated in FIG. 14A. FIG. 14C illustrates a data structure in the case of adding a banner according to another embodiment. The embodiment illustrated in FIG. 14C is an embodiment related to a case in which a banner is added in FIG. 14B. FIG. 14D illustrates a data structure in the case of adding a campaign according to another embodiment. The embodiment illustrated in FIG. 14D is an embodiment related to a case in which a banner is added in FIG. 14C.

Referring to FIG. 14A, the service provider 500 may be a service manager of "A" clothing store, and a project 1412 may be all services performed in the "A" clothing store. The campaigns 1422, 1424, and 1426 may be sub-items of services performed in the "A" clothing store. For example, the "A" clothing store is made up of three floors, and there may be a kids clothing shop on the first floor, a men clothing shop on the second floor, and a women clothing shop on the third floor. The campaigns may include the kids clothing campaign 1422, the men clothing campaign 1424, and the women clothing campaign 1426, which are services respectively performed at the shops Referring to FIG. 14B, a first beacon 1432 and a second beacon 1434 may be installed in the kids clothing shop. The first beacon 1432 may be installed near knit caps and the second beacon 1434 may be installed near T-shirts and dresses. When a user moves to the knit caps, the server may transmit, to the electronic device, a coupon card, a product description card 1442 or the like, related to the knit caps. When the user moves to the T-shirts or the dresses, the server may transmit, to the electronic device, a coupon card, a product description card 1444 or 1446 or the like, related to the T-shirts or the dresses.

Referring to FIG. 14C, a plurality of banners 1452 and 1454 may be coupled to the kids clothing campaign 1422. When the user arrives at the kids clothing shop, the server may transmit the plurality of banners 1452 and 1454 to the electronic device. The server may transmit either the first banner 1452 or the second banner 1454 to the electronic device or may sequentially transmit the first banner 1452 and the second banner 1454 to the electronic device.

Referring to FIG. 14D, the service provider 500 may discount and sell winter stock products of the kids clothing. The kids clothing campaign 1422 may be coupled to a winter clearance sale campaign 1428, and a banner 1456. When the user visits the kids clothing shop, the beacon installed at the kids clothing shop may transmit beacon information 1436 to the electronic device, and the electronic device may transmit the beacon information 1436 to the server. The server receiving the beacon information 1436 may transmit a winter clearance sale card 1448 to the electronic device.

According to an embodiment of the disclosure, the beacon may be installed near products the user has viewed online. When the electronic device is near the products the user has viewed online, the beacon may transmit beacon information to an electronic device. The electronic device receiving the beacon information may transmit the beacon information to the server. The server receiving the beacon information may transmit an additional discount coupon for the products the user has viewed online to the electronic device.

According to an embodiment of the disclosure, existing beacons may be utilized by registering beacon information for existing beacons in the server. For example, when beacon information of beacons installed in a stadium is registered in the server, the server may provide a souvenir coupon or a stadium guide message to an electronic device located near the stadium.

According to an embodiment of the disclosure, it is possible to providing more information to a user of an electronic device by transmitting a URL to the electronic device. For example, in the case of installing a "C" beacon near a "B" artwork in an "A" museum, the server may transmit a website URL of the "A" museum that describes the "B" artwork to an electronic device near the "C" beacon. When the URL is transmitted to the electronic device, the user of the electronic device may get more information about the "B" artwork through the website.

According to an embodiment of the disclosure, a beacon installed in a hospital may be used. For example, when a user arrives at a hospital, the server may transmit guidance for various wards and amenities to the electronic device. The user may make a reservation or pay for medical expenses through content received from the server.

According to an embodiment of the disclosure, a plurality of beacons may be used. For example, a first beacon may be installed at a bus stop and a second beacon may be installed at a clothing store located near the bus stop. When the user arrives at the bus stop, the server may transmit the bus system information (e.g., buses that stop at the bus stop, waiting times, etc.) and new product information of a clothing store to electronic devices.

According to an embodiment of the disclosure, the electronic device may store content received from the server. For example, an electronic device may store bus system information received through a beacon installed at a bus stop, and the user can check bus system information at home.

According to an embodiment of the disclosure, the server 100 illustrated in FIG. 1 may be referred to as an electronic device and the electronic device 200 as an external electronic device.

An electronic device according to an embodiment of the disclosure may include a communication circuit, at least one processor electrically connected to the communication circuit, and memory electrically connected to the at least one processor, wherein the memory may store instructions that cause the at least one processor to receive at least one piece of beacon information from an external electronic device using the communication circuit, determine whether data corresponding to the received at least one piece of beacon information is stored in the memory, generate content having a structured document format including at least a portion of the stored data based on at least partially the determination, and transmit the content to the external electronic device.

The instructions according to an embodiment of the disclosure may cause the at least one processor to, when data corresponding to the received at least one piece of beacon information is not stored in the memory as a result of the determination, collect at least partial data from a website corresponding a URL corresponding to at least a portion of the beacon information and store the collected data in the memory.

The instructions according to an embodiment of the disclosure may cause the at least one processor to, when data corresponding to the received at least one piece of beacon information is not stored in the memory as a result of the determination, collect at least partial data from a website corresponding a URL included in the received at least one piece of beacon information and store the collected data in the memory.

The electronic device according to an embodiment of the disclosure may include at least one server.

The beacon information according to an embodiment of the disclosure may include a battery of the beacon, and position information, an ID, a URL or a MAC address of the beacon.

The instructions according to an embodiment of the disclosure may cause the at least one processor to generate the content having a structured document format using at least one of a json format, an xml format, an html format, and a php format.

At least one server according to an embodiment of the disclosure may include at least one processor and a storage, wherein the at least one processor may be configured to receive beacon information including information on at least one website from the electronic device, collect data from a first website of the at least one website based on the beacon information, generate content having a structured document format based on at least a part of the collected data, and transmit the generated content to the electronic device.

According to an embodiment of the disclosure, the at least one processor may be configured to, when data corresponding to the beacon information is not included in the storage, collect data from the first website of the at least one website based on the beacon information, generate content having a structured document format based on at least a part of the collected data, and transmit the generated content to the electronic device.

According to an embodiment of the disclosure, the at least one processor may be configured to store at least a part of the collected data in the storage.

According to an embodiment of the disclosure, the at least one processor may be configured to collect a manifest file from the first website, obtain the data corresponding to the beacon information based on the manifest file, and transmit the content having a structured document format based on the data corresponding to the beacon information to the electronic device.

According to an embodiment of the disclosure, the at least one processor may be configured to collect meta information from the first website, obtain the data corresponding to the beacon information based on the meta information, and transmit the content having a structured document format based on the data corresponding to the beacon information to the electronic device.

According to an embodiment of the disclosure, the content may include a banner that is an image output to a display of the electronic device and a card corresponding to the beacon information.

According to an embodiment of the disclosure, the at least one processor may generate the content having a structured document format using at least one of a json format, an xml format, an html format, and a php format.

According to an embodiment of the disclosure, the server may further include a dashboard configured to receive data from a content provider (CP), and the at least one processor may be configured to store data input through the dashboard in the storage.

According to an embodiment of the disclosure, the at least one processor may be configured to, when data corresponding to the beacon information is present in the storage, among the data input through the dashboard, generate content having a structured document format based on the data corresponding to the beacon information and transmit the generated content to the electronic device.

According to an embodiment of the disclosure, the at least one processor may be configured to, when no data corresponding to the beacon information is present in the storage, transmit a uniform resource locator (URL) corresponding to the beacon information to the electronic device.

According to an embodiment of the disclosure, the at least one processor may be configured to collect the data from the first website in response to reception of information for update of the data and store the data collected from the first website in the storage.

An electronic device according to an embodiment of the disclosure may include a communication circuit, a memory, a display, and at least one processor, wherein the at least one processor may be configured to, when at least one beacon capable of communicating with the electronic device is found, transmit at least a part of beacon information associated with the found beacon to a server, receive content having a structured document format generated based on data corresponding to the transmitted beacon information from the server, and output the content having a structured document format to the display.

According to an embodiment of the disclosure, the beacon information may include at least one of a type of the beacon, a MAC address of the beacon, position information of the beacon, and a uniform resource locator (URL).

According to an embodiment of the disclosure, the content may include a URL, and the at least one processor may be configured to allow the electronic device to be connected to a website corresponding to the URL in response to a user input touching the URL.

According to an embodiment, the at least one processor may be configured to output a notification indicating reception of the content to the display in response to reception of the content having a structured document format.

According to an embodiment of the disclosure, the at least one processor may be configured to allow the display to output the content in response to a user input touching the notification.

According to an embodiment of the disclosure, the at least one processor may be configured to filter out a beacon related to the data among the at least one beacon capable of communicating with the electronic device and transmit beacon information associated with the filtered-out beacon to the server.

According to an embodiment of the disclosure, the at least one processor may be configured to store the content having a structured document format in the memory.

According to an embodiment of the disclosure, the at least one processor may be configured to transmit information for update of the data to the server, receive content having a structured document format generated based on the updated data from the server and output the content having a structured document format generated based on the updated data to the display.

Figure 15:
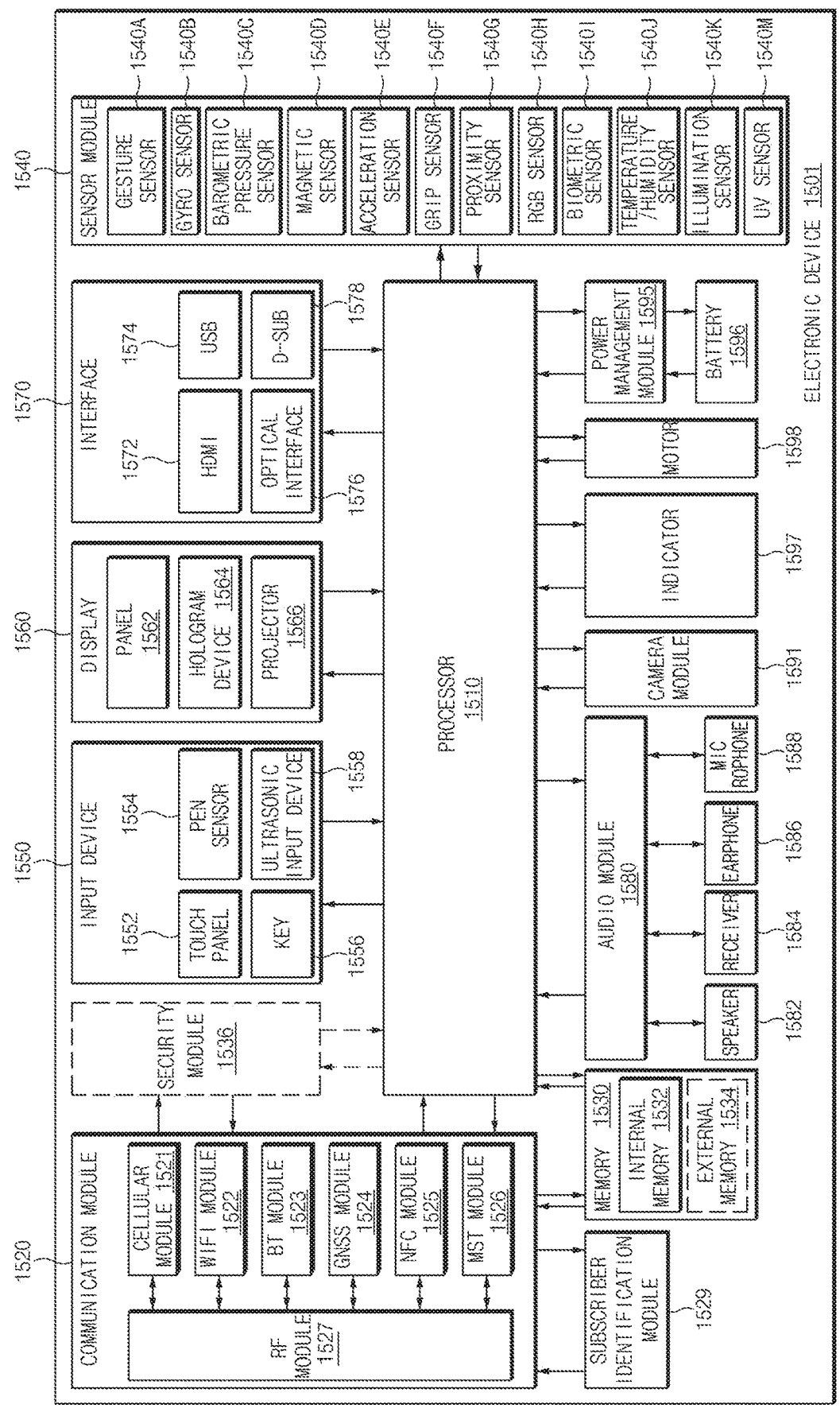
FIG. 15 illustrates a block diagram of an electronic device according to various embodiments.

FIG. 15 illustrates a block diagram of an electronic device, according to various embodiments.

Referring to FIG. 15, an electronic device 1501 may include, for example, all or a part of the electronic device 901 illustrated in FIG. 9. The electronic device 1501 may include one or more processors (e.g., an application processor (AP)) 1510, a communication module 1520, a subscriber identification module 1524, a memory 1530, a sensor module 1540, an input device 1550, a display 1560, an interface 1570, an audio module 1580, a camera module 1591, a power management module 1595, a battery 1596, an indicator 1597, and a motor 1598.

The processor 1510 may drive, for example, an operating system (OS) or an application to control a plurality of hardware or software components connected to the processor 1510 and may process and compute a variety of data. For example, the processor 1510 may be implemented with a System on Chip (SoC). According to an embodiment, the processor 1510 may further include a graphic processing unit (GPU) and/or an image signal processor. The processor 1510 may include at least a part (e.g., a cellular module 1521) of components illustrated in FIG. 15. The processor 1510 may load a command or data, which is received from at least one of other components (e.g., a nonvolatile memory), into a volatile memory and process the loaded command or data. The processor 1510 may store a variety of data in the nonvolatile memory.

The communication module 1520 may be configured the same as or similar to the communication interface 970 of FIG. 9. The communication module 1520 may include the cellular module 1521, a Wi-Fi module 1522, a Bluetooth (BT) module 1523, a GNSS module 1524 (e.g., a GPS module, a Glonass module, a Beidou module, or a Galileo module), a near field communication (NFC) module 1525, a MST module 1526 and a radio frequency (RF) module 1527.

The cellular module 1521 may provide, for example, voice communication, video communication, a character service, an Internet service, or the like over a communication network. According to an embodiment, the cellular module 1521 may perform discrimination and authentication of the electronic device 1501 within a communication network by using the subscriber identification module (e.g., a SIM card) 1529. According to an embodiment, the cellular module 1521 may perform at least a portion of functions that the processor 1510 provides. According to an embodiment, the cellular module 1521 may include a communication processor (CP).

Each of the Wi-Fi module 1522, the BT module 1523, the GNSS module 1524, the NFC module 1525, or the MST module 1526 may include a processor for processing data exchanged through a corresponding module, for example. According to an embodiment, at least a part (e.g., two or more) of the cellular module 1521, the Wi-Fi module 1522, the BT module 1523, the GNSS module 1524, the NFC module 1525, or the MST module 1526 may be included within one Integrated Circuit (IC) or an IC package.

For example, the RF module 1527 may transmit and receive a communication signal (e.g., an RF signal). For example, the RF module 1527 may include a transceiver, a power amplifier module (PAM), a frequency filter, a low noise amplifier (LNA), an antenna, or the like. According to another embodiment, at least one of the cellular module 1521, the Wi-Fi module 1522, the BT module 1523, the GNSS module 1524, the NFC module 1525, or the MST module 1526 may transmit and receive an RF signal through a separate RF module.

The subscriber identification module 1529 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 1530 (e.g., the memory 930) may include an internal memory 1532 or an external memory 1534. For example, the internal memory 1532 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1534 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1534 may be operatively and/or physically connected to the electronic device 1501 through various interfaces.

A security module 1536 may be a module that includes a storage space of which a security level is higher than that of the memory 1530 and may be a circuit that guarantees safe data storage and a protected execution environment. The security module 1536 may be implemented with a separate circuit and may include a separate processor. For example, the security module 1536 may be in a smart chip or a secure digital (SD) card, which is removable, or may include an embedded secure element (eSE) embedded in a fixed chip of the electronic device 1501. Furthermore, the security module 1536 may operate based on an operating system (OS) that is different from the OS of the electronic device 1501. For example, the security module 1536 may operate based on java card open platform (JCOP) OS.

The sensor module 1540 may measure, for example, a physical quantity or may detect an operation state of the electronic device 1501. The sensor module 1540 may convert the measured or detected information to an electric signal. For example, the sensor module 1540 may include at least one of a gesture sensor 1540A, a gyro sensor 1540B, a barometric pressure sensor 1540C, a magnetic sensor 1540D, an acceleration sensor 1540E, a grip sensor 1540F, the proximity sensor 1540G, a color sensor 1540H (e.g., red, green, blue (RGB) sensor), a biometric sensor 1540I, a temperature/humidity sensor 1540J, an illuminance sensor 1540K, or an UV sensor 1540M. Although not illustrated, additionally or alternatively, the sensor module 1540 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1540 may further include a control circuit for controlling at least one or more sensors included therein. According to an embodiment, the electronic device 1501 may further include a processor that is a part of the processor 1510 or independent of the processor 1510 and is configured to control the sensor module 1540. The processor may control the sensor module 1540 while the processor 1510 remains at a sleep state.

The input device 1550 may include, for example, a touch panel 1552, a (digital) pen sensor 1554, a key 1556, or an ultrasonic input unit 1558. For example, the touch panel 1552 may use at least one of capacitive, resistive, infrared and ultrasonic detecting methods. Also, the touch panel 1552 may further include a control circuit. The touch panel 1552 may further include a tactile layer to provide a tactile reaction to a user.

The (digital) pen sensor 1554 may be, for example, a part of a touch panel or may include an additional sheet for recognition. The key 1556 may include, for example, a physical button, an optical key, a keypad, or the like. The ultrasonic input device 1558 may detect (or sense) an ultrasonic signal, which is generated from an input device, through a microphone (e.g., a microphone 1588) and may check data corresponding to the detected ultrasonic signal.

The display 1560 (e.g., the display 960) may include a panel 1562, a hologram device 1564, or a projector 1566. The panel 1562 may be the same as or similar to the display 960 illustrated in FIG. 9. The panel 1562 may be implemented, for example, to be flexible, transparent or wearable. The panel 1562 and the touch panel 1552 may be integrated into a single module. The hologram device 1564 may display a stereoscopic image in a space using a light interference phenomenon. The projector 1566 may project light onto a screen so as to display an image. For example, the screen may be arranged in the inside or the outside of the electronic device 1501. According to an embodiment, the display 1560 may further include a control circuit for controlling the panel 1562, the hologram device 1564, or the projector 1566.

The interface 1570 may include, for example, a high-definition multimedia interface (HDMI) 1572, a universal serial bus (USB) 1574, an optical interface 1576, or a D-subminiature (D-sub) 1578. The interface 1570 may be included, for example, in the communication interface 970 illustrated in FIG. 9. Additionally or alternatively, the interface 1570 may include, for example, a mobile high definition link (MHL) interface, a SD card/multi-media card (MMC) interface, or an infrared data association (IrDA) standard interface.

The audio module 1580 may convert a sound and an electric signal in dual directions. At least a component of the audio module 1580 may be included, for example, in the input/output interface 950 illustrated in FIG. 9. The audio module 1580 may process, for example, sound information that is input or output through a speaker 1582, a receiver 1584, an earphone 1586, or the microphone 1588.

For example, the camera module 1591 may shoot a still image or a video. According to an embodiment, the camera module 1591 may include at least one or more image sensors (e.g., a front sensor or a rear sensor), a lens, an image signal processor (ISP), or a flash (e.g., an LED or a xenon lamp).

The power management module 1595 may manage, for example, power of the electronic device 1501. According to an embodiment, a power management integrated circuit (PMIC), a charger IC, or a battery or fuel gauge may be included in the power management module 1595. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1596 and a voltage, current or temperature thereof while the battery is charged. The battery 1596 may include, for example, a rechargeable battery and/or a solar battery.

The indicator 1597 may display a specific state of the electronic device 1501 or a part thereof (e.g., the processor 1510), such as a booting state, a message state, a charging state, and the like. The motor 1598 may convert an electrical signal into a mechanical vibration and may generate the following effects: vibration, haptic, and the like. Although not illustrated, a processing device (e.g., a GPU) for supporting a mobile TV may be included in the electronic device 1501. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other so as to form one entity, so that the functions of the components may be performed in the same manner as before the combination.

Figure 16:
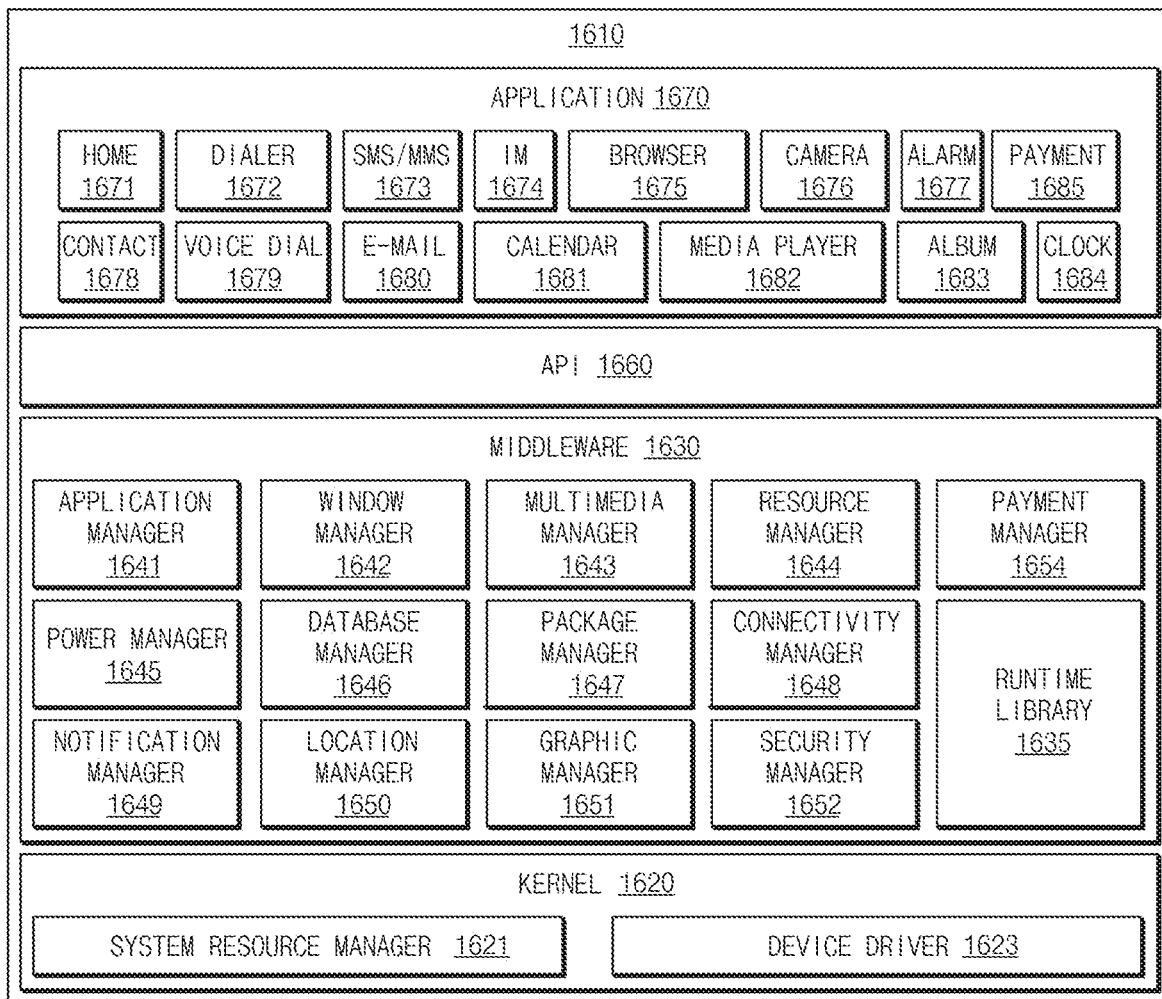
FIG. 16 illustrates a block diagram of a program module according to various embodiments.

FIG. 16 illustrates a block diagram of a program module, according to various embodiments.

According to an embodiment, a program module 1610 (e.g., the program 940) may include an operating system (OS) to control resources associated with an electronic device (e.g., the electronic device 901), and/or diverse applications (e.g., the application program 947) driven on the OS. The OS may be, for example, Android™ iOS™, Windows™, Symbian™, or Tizen™.

The program module 1610 may include a kernel 1620, a middleware 1630, an application programming interface (API) 1660, and/or an application 1670. At least a portion of the program module 1610 may be preloaded on an electronic device or may be downloadable from an external electronic device (e.g., the first electronic device 902, the second electronic device 904, the server 906, or the like).

The kernel 1620 (e.g., the kernel 941) may include, for example, a system resource manager 1621 or a device driver 1623. The system resource manager 1621 may perform control, allocation, or retrieval of system resources. According to an embodiment, the system resource manager 1621 may include a process managing unit, a memory managing unit, or a file system managing unit. The device driver 1623 may include, for example, a display driver, a camera driver, a Bluetooth driver, a shared memory driver, a USB driver, a keypad driver, a Wi-Fi driver, an audio driver, or an inter-process communication (IPC) driver.

The middleware 1630 may provide, for example, a function that the application 1670 needs in common, or may provide diverse functions to the application 1670 through the API 1660 to allow the application 1670 to efficiently use limited system resources of the electronic device. According to an embodiment, the middleware 1630 (e.g., the middleware 943) may include at least one of a runtime library 1635, an application manager 1641, a window manager 1642, a multimedia manager 1643, a resource manager 1644, a power manager 1645, a database manager 1646, a package manager 1647, a connectivity manager 1648, a notification manager 1649, a location manager 1650, a graphic manager 1651, a security manager 1652, or a payment manager 1654.

The runtime library 1635 may include, for example, a library module that is used by a compiler to add a new function through a programming language while the application 1670 is being executed. The runtime library 1635 may perform input/output management, memory management, or capacities about arithmetic functions.

The application manager 1641 may manage, for example, a life cycle of at least one application of the application 1670. The window manager 1642 may manage a graphic user interface (GUI) resource that is used in a screen. The multimedia manager 1643 may identify a format necessary for playing diverse media files, and may perform encoding or decoding of media files by using a codec suitable for the format. The resource manager 1644 may manage resources such as a storage space, memory, or source code of at least one application of the application 1670.

The power manager 1645 may operate, for example, with a basic input/output system (BIOS) to manage a battery or power, and may provide power information for an operation of an electronic device. The database manager 1646 may generate, search for, or modify database that is to be used in at least one application of the application 1670. The package manager 1647 may install or update an application that is distributed in the form of package file.

The connectivity manager 1648 may manage, for example, wireless connection such as Wi-Fi or Bluetooth. The notification manager 1649 may display or notify an event such as arrival message, appointment, or proximity notification in a mode that does not disturb a user. The location manager 1650 may manage location information about an electronic device. The graphic manager 1651 may manage a graphic effect that is provided to a user, or manage a user interface relevant thereto. The security manager 1652 may provide a general security function necessary for system security, user authentication, or the like. According to an embodiment, in the case where an electronic device (e.g., the electronic device 901) includes a telephony function, the middleware 1630 may further include a telephony manager for managing a voice or video call function of the electronic device.

The middleware 1630 may include a middleware module that combines diverse functions of the above-described components. The middleware 1630 may provide a module specialized to each OS kind to provide differentiated functions. Additionally, the middleware 1630 may dynamically remove a part of the preexisting components or may add new components thereto.

The API 1660 (e.g., the API 945) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 1670 (e.g., the application program 947) may include, for example, one or more applications capable of providing functions for a home 1671, a dialer 1672, an SMS/MMS 1673, an instant message (IM) 1674, a browser 1675, a camera 1676, an alarm 1677, a contact 1678, a voice dial 1679, an e-mail 1680, a calendar 1681, a media player 1682, an album 1683, a timepiece 1684, or for offering health care (e.g., measuring an exercise quantity, blood sugar, or the like) or environment information (e.g., information of barometric pressure, humidity, temperature, or the like).

According to an embodiment, the application 1670 may include an application (hereinafter referred to as "information exchanging application" for descriptive convenience) to support information exchange between an electronic device (e.g., the electronic device 901) and an external electronic device (e.g., the first electronic device 902 or the second electronic device 904). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 1670 may include an application (e.g., a health care application of a mobile medical device) that is assigned in accordance with an attribute of an external electronic device. According to an embodiment, the application 1670 may include an application that is received from an external electronic device (e.g., the first electronic device 902, the second electronic device 904, or the server 906). According to an embodiment, the application 1670 may include a preloaded application or a third party application that is downloadable from a server. The names of components of the program module 1610 according to the embodiment may be modifiable depending on kinds of operating systems.

According to various embodiments, at least a portion of the program module 1610 may be implemented by software, firmware, hardware, or a combination of two or more thereof. At least a portion of the program module 1610 may be implemented (e.g., executed), for example, by the processor (e.g., the processor 1510). At least a portion of the program module 1610 may include, for example, modules, programs, routines, sets of instructions, processes, or the like for performing one or more functions.

The term "module" used in the disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 920), may cause the one or more processors to perform a function corresponding to the instruction. The computer-readable storage media, for example, may be the memory 930.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. At least one server capable of communicating with an electronic device, comprising:
at least one processor; and
a storage storing at least one project, wherein the project includes at least one of a campaign, a banner including an image corresponding to the campaign, or a card including an image, a title, text, or a uniform resource locator (URL),
wherein the at least one processor is configured to:
transmit information stored in the storage to the electronic device,
receive beacon information including information on at least one website from the electronic device, wherein the beacon information is filtered based on the information,
determine whether the at least one website included in the beacon information is an acceptable website,
when it is determined that a first web site of the at least one web site is an acceptable website, collect data from the first website of the at least one website based on the beacon information,
generate content having a structured document format based on at least a part of the collected data, and
transmit the generated content to the electronic device.

2. The server of claim 1, wherein the at least one processor is configured to, when data corresponding to the beacon information is not included in the storage:
  collect the data from the first web site of the at least one web site based on the beacon information,
  generate content having a structured document format based on the at least a part of the collected data, and
  transmit the generated content to the electronic device.

3. The server of claim 1, wherein the at least one processor is configured to store the at least a part of the collected data in the storage.

4. The server of claim 1, wherein the at least one processor is configured to collect a manifest file from the first website, obtain data corresponding to the beacon information based on the manifest file, and transmit the content having a structured document format generated based on the data corresponding to the beacon information to the electronic device.

5. The server of claim 1, wherein the at least one processor is configured to collect meta information from the first website, obtain data corresponding to the beacon information based on the meta information, and transmit the content having a structured document format generated based on the data corresponding to the beacon information to the electronic device.

6. The server of claim 1, wherein the content includes a banner that is an image output to a display of the electronic device and a card corresponding to the beacon information.

7. The server of claim 1, wherein the at least one processor is configured to generate the content having a structured document format using at least one of a json format, an xml format, an html format, and a php format.

8. The server of claim 1, further comprising:
  a dashboard configured to receive data from a content provider (CP), wherein the at least one processor is configured to store data input through the dashboard in the storage.

9. The server of claim 8, wherein the at least one processor is configured to, when data corresponding to the beacon information is present in the storage, among the data input through the dashboard, generate the content having a structured document format based on the data corresponding to the beacon information and transmit the generated content to the electronic device.

10. The server of claim 1, wherein the at least one processor is configured to, when there is no data corresponding to the beacon information in the storage, transmit a URL corresponding to the beacon information to the electronic device.

11. The server of claim 1, wherein the at least one processor is configured to collect the data from the first website in response to reception of information for update of the data and store the data collected from the first website in the storage.

* * * * *